United States Patent
Ang et al.

(10) Patent No.: US 12,267,791 B2
(45) Date of Patent: Apr. 1, 2025

(54) USER EQUIPMENT OPERATION IN A HIGH EFFICIENCY TRANSMISSION OPERATING MODE

(71) Applicant: QUALCOMM Incorporated, San Diego, CA (US)

(72) Inventors: Peter Pui Lok Ang, San Diego, CA (US); Joseph Patrick Burke, San Diego, CA (US); Cong Nguyen, San Diego, CA (US); Krishna Kiran Mukkavilli, San Diego, CA (US); Tingfang Ji, San Diego, CA (US); Muhammad Sayed Khairy Abdelghaffar, San Jose, CA (US); Yi Huang, San Diego, CA (US); Wanshi Chen, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/092,145

(22) Filed: Nov. 6, 2020

(65) Prior Publication Data

US 2021/0144657 A1    May 13, 2021

Related U.S. Application Data

(60) Provisional application No. 62/933,961, filed on Nov. 11, 2019.

(51) Int. Cl.
*H04W 52/52* (2009.01)
*H04B 1/401* (2015.01)
(Continued)

(52) U.S. Cl.
CPC ............ *H04W 52/52* (2013.01); *H04B 1/401* (2013.01); *H04W 8/24* (2013.01);
(Continued)

(58) Field of Classification Search
CPC . H04W 52/00–60; H04W 72/23; H04W 8/24; H04W 52/0261; H04W 52/146; H04W 52/365; H04W 52/52; H04B 1/401
See application file for complete search history.

(56) References Cited

U.S. PATENT DOCUMENTS 8,260,226 B1 *  9/2012  Lipshitz ................... H04B 1/04
                                                        455/127.2
8,811,322 B2 *  8/2014  Feuersanger ........... H04L 5/006
                                                        370/329
(Continued)

FOREIGN PATENT DOCUMENTS

CN        105515538 A       4/2016
CN        108370546 A       8/2018
(Continued)

OTHER PUBLICATIONS

International Search Report and Written Opinion—PCT/US2020/059652—ISA/EPO—Feb. 22, 2021 (200518WO).

*Primary Examiner* — Raymond S Dean
(74) *Attorney, Agent, or Firm* — QUALCOMM IP DEPT.; James Hunt Yancey, Jr.

(57) ABSTRACT

Methods, systems, and devices for wireless communications are described. A user equipment (UE) may be capable of operating according to a first transmission efficiency operating mode and a second transmission efficiency operating mode that is less power efficient than the first transmission efficiency operating mode. The first transmission efficiency operating mode may be associated with a first undesired emission level that is greater than a second undesired emission level associated with the second transmission (Continued)

efficiency operating mode. The UE may select to operate in one of the two transmission efficiency operating modes based on one or more communication parameters (e.g., indicated by control signaling received from a base station). For example, the UE may select to operate in the first transmission efficiency operating mode based on determining that one or more of the communication parameters satisfies at least one parameter criterion for operating in the first transmission efficiency operating mode.

27 Claims, 20 Drawing Sheets

(51) Int. Cl.
  *H04W 8/24* (2009.01)
  *H04W 52/02* (2009.01)
  *H04W 52/14* (2009.01)
  *H04W 52/36* (2009.01)
  *H04W 72/23* (2023.01)

(52) U.S. Cl.
  CPC ..... *H04W 52/0261* (2013.01); *H04W 52/146* (2013.01); *H04W 52/365* (2013.01); *H04W 72/23* (2023.01)

(56) References Cited

U.S. PATENT DOCUMENTS

| | | | |
|---|---|---|---|
| 2009/0191910 A1 | 7/2009 | Athalye et al. | |
| 2011/0086599 A1* | 4/2011 | Nentwig | H04B 17/10 455/115.1 |
| 2011/0255629 A1* | 10/2011 | Ko | H04B 7/0639 375/296 |
| 2012/0115520 A1* | 5/2012 | Rossel | H04B 7/0857 455/501 |
| 2012/0207112 A1* | 8/2012 | Kim | H04W 52/146 370/328 |
| 2014/0184335 A1 | 7/2014 | Nobbe et al. | |
| 2015/0049683 A1* | 2/2015 | Barbieri | H04L 5/0073 370/329 |
| 2015/0208358 A1* | 7/2015 | Ahn | H04W 52/146 455/522 |
| 2016/0105151 A1* | 4/2016 | Langer | H04B 1/0483 330/295 |
| 2016/0255594 A1* | 9/2016 | Vajapeyam | H04W 52/346 455/522 |
| 2017/0359029 A1* | 12/2017 | Nobbe | H03F 1/0227 |
| 2018/0146440 A1* | 5/2018 | Hosseini | H04W 52/365 |
| 2018/0302906 A1 | 10/2018 | Baldemair et al. | |
| 2019/0036673 A1* | 1/2019 | Chen | H04L 5/0064 |
| 2019/0181910 A1* | 6/2019 | Goto | H04W 72/04 |
| 2019/0190668 A1* | 6/2019 | Lei | H04W 74/085 |
| 2019/0372741 A1* | 12/2019 | Kazmi | H04W 4/70 |
| 2020/0053657 A1* | 2/2020 | MolavianJazi | H04W 52/281 |
| 2020/0280926 A1* | 9/2020 | Piipponen | H04W 52/146 |
| 2020/0314869 A1* | 10/2020 | Xu | H04W 72/23 |

FOREIGN PATENT DOCUMENTS

| | | | | |
|---|---|---|---|---|
| CN | 109151981 A | * | 1/2019 | .......... H04W 52/365 |
| CN | 109923906 A | | 6/2019 | |
| EP | 3413637 A1 | | 12/2018 | |
| EP | 3537828 A1 | | 9/2019 | |
| WO | WO-2018088953 A1 | | 5/2018 | |
| WO | WO-2019097116 A1 | | 5/2019 | |

* cited by examiner

USER EQUIPMENT OPERATION IN A HIGH EFFICIENCY TRANSMISSION OPERATING MODE

CROSS REFERENCE

The present application for patent claims the benefit of U.S. Provisional Patent Application No. 62/933,961 by ANG et al., entitled "USER EQUIPMENT OPERATION IN A HIGH EFFICIENCY TRANSMISSION OPERATING MODE," filed Nov. 11, 2019, assigned to the assignee hereof, and expressly incorporated by reference herein.

BACKGROUND

The following relates generally to wireless communications, and more specifically to user equipment (UE) operation in a high efficiency transmission operating mode.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UEs.

A wireless multiple-access communications system may include a number of base stations or network access nodes, each simultaneously supporting communication for multiple communication devices, which may be otherwise known as user equipment (UE). In some cases, different UEs within a wireless communications system may have different power requirements or hardware (e.g., power amplifiers) for communicating with a base station or other UEs. For example, different UEs may use different power amplifiers capable of achieving the different power requirements. Efficient power utilization techniques for UEs are desired.

SUMMARY

The described techniques relate to improved methods, systems, devices, and apparatuses that support user equipment (UE) operation in a high efficiency transmission operating mode. Generally, the described techniques provide for a UE to select a high efficiency transmission operating mode if one or more communication parameters satisfy at least one parameter criterion. That is, the UE may be capable of operating in a first transmission efficiency operating mode that has a higher efficiency than a second transmission efficiency operating mode. The first transmission efficiency operating mode may be more power amplifier efficient and associated with a higher emission level (e.g., a transmission power emission level) than the second transmission efficiency operating mode. The UE may receive control signaling from a base station indicating one or more communication parameters for one or more subsequent uplink transmissions. The UE may determine whether one or more of the communication parameters satisfy at least one parameter criterion for operating in the first transmission efficiency operating mode. If the UE determines that one or more of the communication parameters fails to satisfy the one or more parameter criterion, the UE may refrain from operating in the first transmission efficiency operating mode and may instead select to operate in the second transmission efficiency operating mode. Additionally, if the UE determines that one or more of the communication parameters satisfies the at least one parameter criterion, the UE may select to operate in the first transmission efficiency operating mode. The UE may then operate a power amplifier of the UE according to the selected transmission efficiency operating mode.

An apparatus for wireless communications by a UE that is capable of operating according to a first transmission efficiency operating mode and a second transmission efficiency operating mode that is less power efficient than the first transmission efficiency operating mode, the first transmission efficiency operating mode associated with a first undesired emission level and the second transmission efficiency operating mode associated with a second undesired emission level that is lower than the first undesired emission level, the apparatus including is described. The apparatus may include a power amplifier, at least one antenna, a processor, memory coupled with the processor, and instructions stored in the memory and executable by the processor. The instructions may cause the apparatus to receive, from a base station, control signaling that indicates at least one communication parameter for communicating an uplink transmission, and select to operate in the first transmission efficiency operating mode based on a determination that the at least one communication parameter satisfies at least one parameter criterion for operating in the first transmission efficiency operating mode. The power amplifier may be configured to generate the uplink transmission in accordance with the first transmission efficiency operating mode and the at least one antenna may be configured to transmit the uplink transmission.

Some examples of the apparatus described herein may further include a transmitter, where the transmitter and the power amplifier are configured to generate the uplink transmission in accordance with the first transmission efficiency operating mode.

Some examples of the apparatus described herein may further include operations, features, means, or instructions for transmitting, to the base station, an indication of a capability of the UE to operate according to the first transmission efficiency operating mode and the second transmission efficiency operating mode.

Some examples of the apparatus described herein may further include operations, features, means, or instructions for receiving the control signaling indicating the at least one communication parameter that may be a scheduled uplink bandwidth part allocated for the uplink transmission, where the at least one parameter criterion may be that the uplink bandwidth part satisfies a bandwidth threshold and may be located at least a threshold distance away from a band edge of a channel bandwidth.

Some examples of the apparatus described herein may further include operations, features, means, or instructions for receiving the control signaling indicating the at least one communication parameter that may be an uplink modulation and coding scheme allocated for the uplink transmission, where the at least one parameter criterion may be that the uplink modulation and coding scheme satisfies a modulation and coding scheme threshold.

Some examples of the apparatus described herein may further include operations, features, means, or instructions for receiving the control signaling indicating the at least one communication parameter that may be a scheduled frequency resource that may be allocated for the uplink transmission, where the at least one parameter criterion may be that the scheduled frequency resource satisfies a bandwidth threshold and may be located at least a threshold distance away from a band edge of a channel bandwidth.

Some examples of the apparatus described herein may further include operations, features, means, or instructions for receiving the control signaling indicating the at least one communication parameter that may be a defined number of transmission time intervals, where the at least one parameter criterion may be that the UE may be capable of switching from the second transmission efficiency operating mode to the first transmission efficiency operating mode within the defined number of transmission time intervals.

Some examples of the apparatus described herein may further include operations, features, means, or instructions for transmitting, to the base station, a request for the at least one communication parameter.

In some examples of the apparatus described herein, the request indicates a requested bandwidth part, a requested frequency location relative to a band edge of a channel bandwidth, or both.

Some examples of the apparatus described herein may further include operations, features, means, or instructions for transmitting a power headroom report indicating a maximum UE transmit power, power headroom, or both, for a set of subbands within a channel bandwidth, where the control signaling may be received based on transmitting the power headroom report.

Some examples of the apparatus described herein may further include operations, features, means, or instructions for transmitting a medium access control (MAC) control element that may have a set of fields, each field of the set of fields indicating the maximum UE transmit power, power headroom, or both, for a respective subband of the set of subbands per component carrier.

Some examples of the apparatus described herein may further include operations, features, means, or instructions for transmitting the power headroom report that indicates the maximum UE transmit power, the power headroom, or both, for each full subband of the set of subbands and maximum UE transmit power, power headroom, or both, for each partial subband of the set of subbands.

Some examples of the apparatus described herein may further include operations, features, means, or instructions for transmitting an actual power headroom report indicating maximum UE transmit power, power headroom, or both, for one or more resource blocks allocated in a grant.

Some examples apparatus described herein may further include operations, features, means, or instructions for transmitting a virtual power headroom report indicating maximum UE transmit power, power headroom, or both, for one or more resource blocks based on at least one defined parameter value.

In some examples of the apparatus described herein, the at least one defined parameter value indicates a reference physical uplink shared channel.

Some examples of the apparatus described herein may further include a transmitter. Here, the apparatus may include operations, features, means, or instructions for adjusting at least one bias voltage for the power amplifier and at least one control parameter of the transmitter to operate in the first transmission efficiency operating mode based on the selecting to operate in the first transmission efficiency operating mode, and generate, by the power amplifier and the transmitter, the uplink transmission based on the adjusted bias voltage and the adjusted at least one control parameter.

Some examples of the apparatus described herein may further include a transmitter. Here, the apparatus may include operations, features, means, or instructions for adjusting at least one bias voltage of the power amplifier and at least one control parameter of the transmitter and the power amplifier to operate in the first transmission efficiency operating mode based on the selecting to operate in the first transmission efficiency operating mode, and generate, by the power amplifier and the transmitter, the uplink transmission based on the adjusted bias voltage and the adjusted at least one control parameter.

Some examples of the apparatus described herein may further include operations, features, means, or instructions for performing noise and undesired emission shaping on a signal to generate a noise and emission shaped signal that may have lower or shaped in-band distortion based on selecting to operate in the first transmission efficiency operating mode.

Some examples of the apparatus described herein may further include a transmitter and operations, features, means, or instructions for generating, by the transmitter and the power amplifier, the uplink transmission based on the noise and emission shaped signal.

Some examples of the apparatus described herein may further include operations, features, means, or instructions for transmitting a mode indicator to indicate that the UE may be operating in the first transmission efficiency operating mode.

In some examples of the apparatus described herein, the first undesired emission level corresponds to a non-linear portion of a signal output by the power amplifier.

In some examples of the apparatus described herein, the first undesired emission level may be a non-linear emission level, an intermodulation product emission level, a harmonic emission level, or any combination thereof, for a signal output by the power amplifier.

A method of wireless communications by a UE that is capable of operating according to a first transmission efficiency operating mode and a second transmission efficiency operating mode that is less power efficient than the first transmission efficiency operating mode, the first transmission efficiency operating mode associated with a first undesired emission level and the second transmission efficiency operating mode associated with a second undesired emission level that is lower than the first undesired emission level, the method including is described. The method may include receiving, from a base station, control signaling that indicates at least one communication parameter for communicating an uplink transmission, selecting to operate in the first transmission efficiency operating mode based on a determination that the at least one communication parameter satisfies at least one parameter criterion for operating in the first transmission efficiency operating mode, and transmitting, based on the at least one communication parameter, the uplink transmission that is generated by operating a power amplifier of the UE in accordance with the first transmission efficiency operating mode.

An apparatus for wireless communications by a UE that is capable of operating according to a first transmission efficiency operating mode and a second transmission efficiency operating mode that is less power efficient than the first transmission efficiency operating mode, the first transmission efficiency operating mode associated with a first undesired emission level and the second transmission efficiency operating mode associated with a second undesired emission level that is lower than the first undesired emission level, the method including is described. The apparatus may include a processor, memory coupled with the processor, and instructions stored in the memory. The instructions may be executable by the processor to cause the apparatus to receive, from a base station, control signaling that indicates at least one communication parameter for communicating an uplink transmission, select to operate in the first transmission efficiency operating mode based on a determination that the at least one communication parameter satisfies at least one parameter criterion for operating in the first transmission efficiency operating mode, and transmit, based on the at least one communication parameter, the uplink transmission that is generated by operating a power amplifier of the UE in accordance with the first transmission efficiency operating mode.

Another apparatus for wireless communications by a UE that is capable of operating according to a first transmission efficiency operating mode and a second transmission efficiency operating mode that is less power efficient than the first transmission efficiency operating mode, the first transmission efficiency operating mode associated with a first undesired emission level and the second transmission efficiency operating mode associated with a second undesired emission level that is lower than the first undesired emission level, the method including is described. The apparatus may include means for receiving, from a base station, control signaling that indicates at least one communication parameter for communicating an uplink transmission, selecting to operate in the first transmission efficiency operating mode based on a determination that the at least one communication parameter satisfies at least one parameter criterion for operating in the first transmission efficiency operating mode, and transmitting, based on the at least one communication parameter, the uplink transmission that is generated by operating a power amplifier of the UE in accordance with the first transmission efficiency operating mode.

A non-transitory computer-readable medium storing code for wireless communications by a UE that is capable of operating according to a first transmission efficiency operating mode and a second transmission efficiency operating mode that is less power efficient than the first transmission efficiency operating mode, the first transmission efficiency operating mode associated with a first undesired emission level and the second transmission efficiency operating mode associated with a second undesired emission level that is lower than the first undesired emission level, the method including is described. The code may include instructions executable by a processor to receive, from a base station, control signaling that indicates at least one communication parameter for communicating an uplink transmission, select to operate in the first transmission efficiency operating mode based on a determination that the at least one communication parameter satisfies at least one parameter criterion for operating in the first transmission efficiency operating mode, and transmit, based on the at least one communication parameter, the uplink transmission that is generated by operating a power amplifier of the UE in accordance with the first transmission efficiency operating mode.

In some examples of the method, apparatuses, and non-transitory computer-readable medium described herein, the uplink transmission is further generated by operating a transmitter of the UE in accordance with the first transmission efficiency operating mode.

Some examples of the method, apparatuses, and non-transitory computer-readable medium described herein may further include operations, features, means, or instructions for transmitting, to a base station, an indication of a capability of the UE to operate according to the first transmission efficiency operating mode and the second transmission efficiency operating mode.

In some examples of the method, apparatuses, and non-transitory computer-readable medium described herein, receiving the control signaling may include operations, features, means, or instructions for receiving the control signaling that indicates the at least one communication parameter that may be a scheduled uplink bandwidth part allocated for the uplink transmission, where the at least one parameter criterion may be that the uplink bandwidth part satisfies a bandwidth threshold and may be located at least a threshold distance away from a band edge of a channel bandwidth.

In some examples of the method, apparatuses, and non-transitory computer-readable medium described herein, receiving the control signaling may include operations, features, means, or instructions for receiving the control signaling that indicates the at least one communication parameter that may be an uplink modulation and coding scheme allocated for the uplink transmission, where the at least one parameter criterion may be that the uplink modulation and coding scheme satisfies a modulation and coding scheme threshold.

In some examples of the method, apparatuses, and non-transitory computer-readable medium described herein, receiving the control signaling may include operations, features, means, or instructions for receiving the control signaling that indicates the at least one communication parameter that may be a scheduled frequency resource that may be allocated for uplink transmission, where the at least one parameter criterion may be that the scheduled frequency resource satisfies a bandwidth threshold and may be located at least a threshold distance away from a band edge of a channel bandwidth.

In some examples of the method, apparatuses, and non-transitory computer-readable medium described herein, receiving the control signaling may include operations, features, means, or instructions for receiving the control signaling that indicates the at least one communication parameter that may be a defined number of transmission time intervals, where the at least one parameter criterion may be that the UE being capable of switching from the second transmission efficiency operating mode to the first transmission efficiency operating mode within the defined number of transmission time intervals.

Some examples of the method, apparatuses, and non-transitory computer-readable medium described herein may further include operations, features, means, or instructions for transmitting, to the base station, a request for the at least one communication parameter.

In some examples of the method, apparatuses, and non-transitory computer-readable medium described herein, the request indicates a requested bandwidth part, a requested frequency location relative to a band edge of a channel bandwidth, or both.

Some examples of the method, apparatuses, and non-transitory computer-readable medium described herein may further include operations, features, means, or instructions for transmitting a power headroom report indicating maximum UE transmit power, power headroom, or both, for a set of subbands within a channel bandwidth, where the control signaling may be received based on transmitting the power headroom report.

In some examples of the method, apparatuses, and non-transitory computer-readable medium described herein, transmitting the power headroom report may include operations, features, means, or instructions for transmitting a MAC control element that may have a set of fields, each field of the set of fields indicating maximum UE transmit power, power headroom, or both, for a respective subband of the set of subbands per component carrier.

In some examples of the method, apparatuses, and non-transitory computer-readable medium described herein, transmitting the power headroom report may include operations, features, means, or instructions for transmitting the power headroom report that indicates the maximum UE transmit power, the power headroom, or both, for each full subband of the set of subbands and maximum UE transmit power, power headroom, or both, for each partial subband of the set of subbands.

Some examples of the method, apparatuses, and non-transitory computer-readable medium described herein may further include operations, features, means, or instructions for transmitting an actual power headroom report indicating maximum UE transmit power, power headroom, or both, for one or more resource blocks allocated in a grant.

Some examples of the method, apparatuses, and non-transitory computer-readable medium described herein may further include operations, features, means, or instructions for transmitting a virtual power headroom report indicating maximum UE transmit power, power headroom, or both, for one or more resource blocks based on at least one defined parameter value.

In some examples of the method, apparatuses, and non-transitory computer-readable medium described herein, the at least one defined parameter value indicates a reference physical uplink shared channel.

Some examples of the method, apparatuses, and non-transitory computer-readable medium described herein may further include operations, features, means, or instructions for adjusting at least one bias voltage for the power amplifier and at least one control parameter for a transmitter of the UE to operate in the first transmission efficiency operating mode based on the selecting to operate in the first transmission efficiency operating mode, and generating, by the power amplifier and the transmitter, the uplink transmission based on the adjusted bias voltage.

Some examples of the method, apparatuses, and non-transitory computer-readable medium described herein may further include operations, features, means, or instructions for performing noise and undesired emission shaping on a signal to generate a noise and emission shaped signal that may have lower or shaped in-band distortion based on selecting to operate in the first transmission efficiency operating mode.

Some examples of the method, apparatuses, and non-transitory computer-readable medium described herein may further include operations, features, means, or instructions for generating, by the power amplifier, the uplink transmission based on the noise and emission shaped signal.

Some examples of the method, apparatuses, and non-transitory computer-readable medium described herein may further include operations, features, means, or instructions for generating, by a transmitter of the UE and the power amplifier, the uplink transmission based on the noise and emission shaped signal.

Some examples of the method, apparatuses, and non-transitory computer-readable medium described herein may further include operations, features, means, or instructions for transmitting a mode indicator to indicate that the UE may be operating in the first transmission efficiency operating mode.

A method of wireless communications by a base station is described. The method may include transmitting, to a user equipment, control signaling that indicates at least one communication parameter for communicating an uplink transmission, receiving a mode indicator indicating that the user equipment is operating in a first transmission efficiency operating mode that is more power efficient and has a higher undesired emission level than a second transmission efficiency operating mode, receiving, based on the at least one communication parameter, the uplink transmission that is generated by the user equipment operating in accordance with the first transmission efficiency operating mode, and performing interference cancellation on the uplink transmission based on the mode indicator.

An apparatus for wireless communications by a base station is described. The apparatus may include a processor, memory coupled with the processor, and instructions stored in the memory. The instructions may be executable by the processor to cause the apparatus to transmit, to a user equipment, control signaling that indicates at least one communication parameter for communicating an uplink transmission, receive a mode indicator indicating that the user equipment is operating in a first transmission efficiency operating mode that is more power efficient and has a higher undesired emission level than a second transmission efficiency operating mode, receive, based on the at least one communication parameter, the uplink transmission that is generated by the user equipment operating in accordance with the first transmission efficiency operating mode, and perform interference cancellation on the uplink transmission based on the mode indicator.

Another apparatus for wireless communications by a base station is described. The apparatus may include means for transmitting, to a user equipment, control signaling that indicates at least one communication parameter for communicating an uplink transmission, receiving a mode indicator indicating that the user equipment is operating in a first transmission efficiency operating mode that is more power efficient and has a higher undesired emission level than a second transmission efficiency operating mode, receiving, based on the at least one communication parameter, the uplink transmission that is generated by the user equipment operating in accordance with the first transmission efficiency operating mode, and performing interference cancellation on the uplink transmission based on the mode indicator.

A non-transitory computer-readable medium storing code for wireless communications by a base station is described. The code may include instructions executable by a processor to transmit, to a user equipment, control signaling that indicates at least one communication parameter for communicating an uplink transmission, receive a mode indicator indicating that the user equipment is operating in a first transmission efficiency operating mode that is more power efficient and has a higher undesired emission level than a second transmission efficiency operating mode, receive, based on the at least one communication parameter, the uplink transmission that is generated by the user equipment operating in accordance with the first transmission efficiency operating mode, and perform interference cancellation on the uplink transmission based on the mode indicator.

Some examples of the method, apparatuses, and non-transitory computer-readable medium described herein may further include operations, features, means, or instructions for receiving an indication of a capability of the user equipment to operate according to the first transmission efficiency operating mode and the second transmission efficiency operating mode.

In some examples of the method, apparatuses, and non-transitory computer-readable medium described herein, transmitting the control signaling may include operations, features, means, or instructions for transmitting the control signaling that indicates the at least one communication parameter may be a scheduled uplink bandwidth part allocated for the uplink transmission.

In some examples of the method, apparatuses, and non-transitory computer-readable medium described herein, transmitting the control signaling may include operations, features, means, or instructions for transmitting the control signaling that indicates the at least one communication parameter may be an uplink modulation and coding scheme allocated for the uplink transmission.

In some examples of the method, apparatuses, and non-transitory computer-readable medium described herein, transmitting the control signaling may include operations, features, means, or instructions for transmitting the control signaling that indicates the at least one communication parameter may be a scheduled frequency resource that may be allocated for the uplink transmission.

In some examples of the method, apparatuses, and non-transitory computer-readable medium described herein, transmitting the control signaling may include operations, features, means, or instructions for transmitting the control signaling that indicates the at least one communication parameter that may be a defined number of transmission time intervals.

Some examples of the method, apparatuses, and non-transitory computer-readable medium described herein may further include operations, features, means, or instructions for receiving a request for the at least one communication parameter.

In some examples of the method, apparatuses, and non-transitory computer-readable medium described herein, the request indicates a requested bandwidth part, a requested frequency location relative to a band edge of a channel bandwidth, or both.

Some examples of the method, apparatuses, and non-transitory computer-readable medium described herein may further include operations, features, means, or instructions for receiving a power headroom report indicating maximum UE transmit power, power headroom, or both, for a set of subbands within a channel bandwidth.

In some examples of the method, apparatuses, and non-transitory computer-readable medium described herein, receiving the power headroom report may include operations, features, means, or instructions for receiving a MAC control element that may have a set of fields, each field of the set of fields indicating maximum UE transmit power, power headroom, or both, for a respective subband of the set of subbands per component carrier.

In some examples of the method, apparatuses, and non-transitory computer-readable medium described herein, receiving the power headroom report may include operations, features, means, or instructions for receiving the power headroom report that indicates the maximum UE transmit power, the power headroom, or both, for each full subband of the set of subbands and maximum UE transmit power, power headroom, or both, for each partial subband of the set of subbands.

Some examples of the method, apparatuses, and non-transitory computer-readable medium described herein may further include operations, features, means, or instructions for receiving an actual power headroom report indicating maximum UE transmit power, power headroom, or both, for one or more resource blocks allocated in a grant.

Some examples of the method, apparatuses, and non-transitory computer-readable medium described herein may further include operations, features, means, or instructions for receiving a virtual power headroom report indicating maximum UE transmit power, power headroom, or both, for one or more resource blocks based on at least one defined parameter value.

In some examples of the method, apparatuses, and non-transitory computer-readable medium described herein, the at least one defined parameter value indicates a reference physical uplink shared channel.

In some examples of the method, apparatuses, and non-transitory computer-readable medium described herein, performing interference cancellation on the uplink transmission may include operations, features, means, or instructions for performing non-linear interference cancellation on the uplink transmission.

In some examples of the method, apparatuses, and non-transitory computer-readable medium described herein, instructing the UE may include operations, features, means, or instructions for instructing the UE to operate in the first transmission efficiency operating mode using the at least one communication parameter that may be a defined number of transmission time intervals.

A method of wireless communications by a base station is described. The method may include receiving, from a UE, an indication that the UE is capable of operating in a first transmission efficiency operating mode, determining that at least one communication parameter satisfies at least one parameter criterion for operating in the first transmission efficiency operating mode, and instructing the UE to operate in the first transmission efficiency operating mode using the at least one communication parameter.

An apparatus for wireless communications by a base station is described. The apparatus may include a processor, memory coupled with the processor, and instructions stored in the memory. The instructions may be executable by the processor to cause the apparatus to receive, from a UE, an indication that the UE is capable of operating in a first transmission efficiency operating mode, determine that at least one communication parameter satisfies at least one parameter criterion for operating in the first transmission efficiency operating mode, and instruct the UE to operate in the first transmission efficiency operating mode using the at least one communication parameter.

Another apparatus for wireless communications by a base station is described. The apparatus may include means for receiving, from a UE, an indication that the UE is capable of operating in a first transmission efficiency operating mode, determining that at least one communication parameter satisfies at least one parameter criterion for operating in the first transmission efficiency operating mode, and instructing the UE to operate in the first transmission efficiency operating mode using the at least one communication parameter.

A non-transitory computer-readable medium storing code for wireless communications by a base station is described. The code may include instructions executable by a processor to receive, from a UE, an indication that the UE is capable of operating in a first transmission efficiency operating mode, determine that at least one communication parameter satisfies at least one parameter criterion for operating in the first transmission efficiency operating mode, and instruct the UE to operate in the first transmission efficiency operating mode using the at least one communication parameter.

In some examples of the method, apparatuses, and non-transitory computer-readable medium described herein, instructing the UE may include operations, features, means, or instructions for instructing the UE to operate in the first transmission efficiency operating mode using the at least one communication parameter that may be a scheduled uplink bandwidth part allocated for an uplink transmission.

In some examples of the method, apparatuses, and non-transitory computer-readable medium described herein, instructing the UE may include operations, features, means, or instructions for instructing the UE to operate in the first transmission efficiency operating mode using the at least one communication parameter that may be an uplink modulation and coding scheme allocated for an uplink transmission.

In some examples of the method, apparatuses, and non-transitory computer-readable medium described herein, instructing the UE may include operations, features, means, or instructions for instructing the UE to operate in the first transmission efficiency operating mode using the at least one communication parameter that may be a scheduled frequency resource allocated for an uplink transmission.

DETAILED DESCRIPTION

Figure 1:
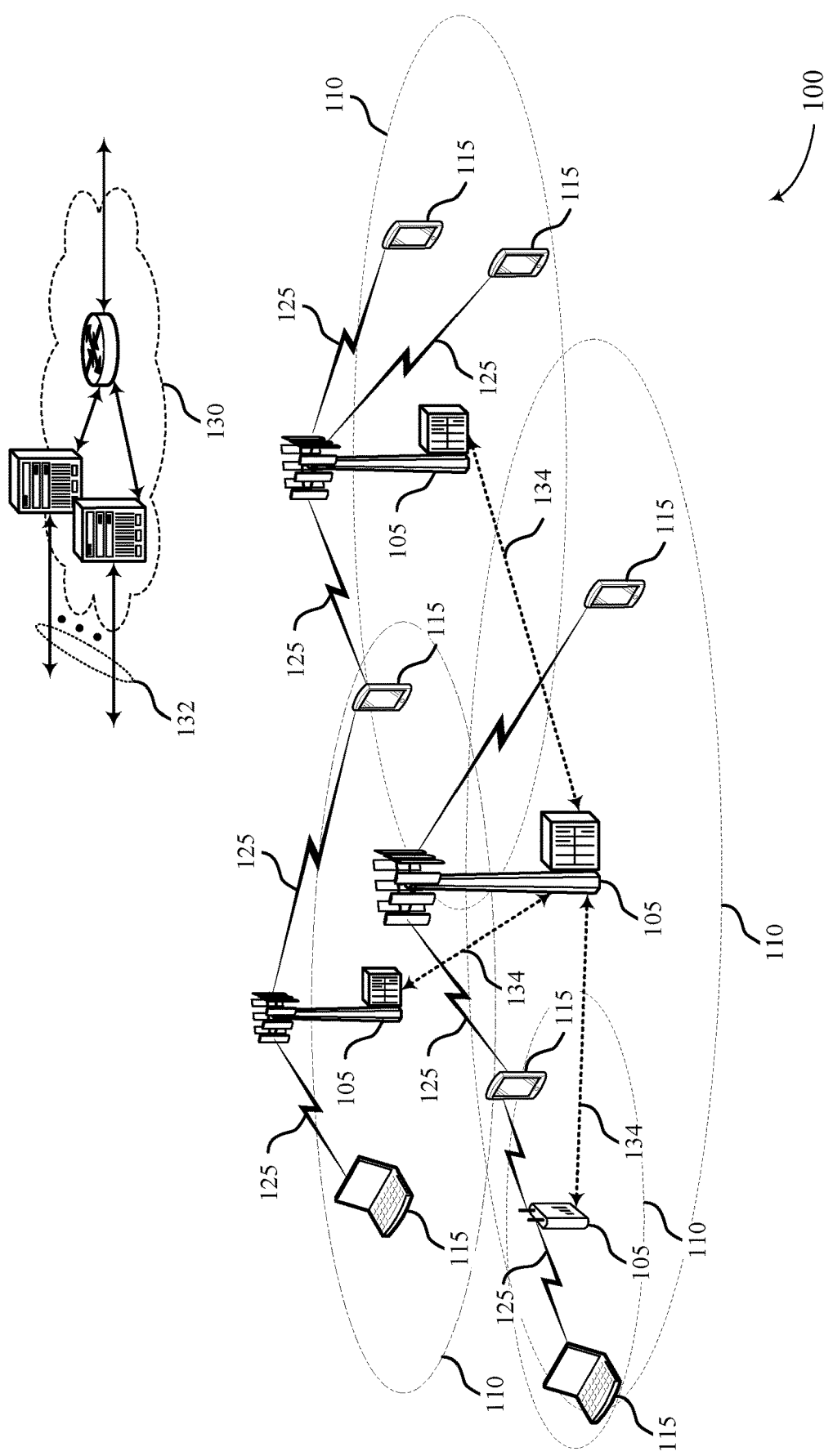
FIG. 1 illustrates an example of a system for wireless communications that supports user equipment (UE) operation in a high efficiency transmission operating mode in accordance with aspects of the present disclosure.

In some wireless communications systems, a base station may configure a user equipment (UE) with one or more frequency resources (e.g., a resource allocation), where scheduled transmissions can occur between the base station and the UE (e.g., uplink and/or downlink communications). For example, uplink transmissions from the UE to the base station may occur within the configured frequency resources, where a transmission power associated with the uplink transmissions may also be confined to the frequency resources. However, the UE may be capable of operating in a higher transmission efficiency operating mode associated with a power leakage resulting in power for one of the uplink transmissions spilling into other frequency resources (e.g., outside the configured frequency resources for the uplink transmissions). Examples of other frequency resources may be adjacent frequency resources or channels, other channels within an operator's bandwidth, other channels of other systems, channels that include out of band harmonics of a power amplifier of the UE (e.g., where such channels are used by different operators), etc. A UE may determine if power leakage (e.g., resulting from a high transmission efficiency operating mode) is acceptable for an uplink transmission.

When a UE generates a signal to transmit to a base station, a power amplifier of the UE may perform power amplification on a received input signal to generate an output signal. The output signal may have desired portion and an undesired portion resulting from how linear the power amplifier is able to amplify the received signal. The desired portion may correspond to a linear amplification of the received input signal by the power amplifier and has desirable properties in the frequency domain within a scheduled resource allocation or scheduled bandwidth part. The undesired portion may correspond to the non-linear amplification of the received input signal by the power amplifier and may have undesirable properties in the frequency domain that may result in spurious emissions within a scheduled resource allocation or scheduled bandwidth part caused by signal amplification by the power amplifier, outside of the scheduled resource allocation or scheduled bandwidth part, or both. Examples of undesired portions of the output signal may include intermodulation products, harmonics, or the like. When operating in the higher efficiency transmission operating mode, the power amplifier may operate closer to a saturation level of the power amplifier that provides at least some non-linear amplification of the received input signal, and hence the undesired portion may have a higher undesired emission level as compared to when the user equipment operates in the normal mode. A UE operating in the normal mode may operate away from the saturation level of the power amplifier and provide more linear, and less non-linear, amplification of the received input signal.

Because the scheduled resource allocation or scheduled bandwidth part may be much narrower than a channel bandwidth in certain wireless communications systems, such as NR, the UE may select to operate in the higher efficiency transmission operating mode in certain situations where the negative impact of the undesired portion of the signal generated by the power amplifier on other communications within the channel bandwidth may be sufficiently managed, to permit the UE to operate in the more power efficient efficiency transmission operating mode. For example, NR wireless communications systems may schedule bands that are much wider than bands of other types of wireless communications systems, such as LTE. In-band emissions (IBE) within an NR band may be managed by the base station and/or UE to provide for acceptable communication within the NR band, while also meeting a specified adjacent channel leakage ratio (ACLR) mandated by a technical specification, a government agency, etc., for an adjacent NR band. In an example, NR wireless communications systems may schedule a band having a 100 MHz bandwidth, and may allocate 10 MHz subbands within the band. In situations where a 10 MHz band is away from a band edge of the 100 MHz band, alone or in combination with other factors (e.g., scheduled MCS), the UE may select to operate in the higher efficiency transmission operating mode to reduce the amount of power consumed by the PA, even though the signal output by the power amplifier may have a higher undesired emission level than when the UE operates in a normal mode. Because the subband is away from the band edge, the ACLR condition may be satisfied and an IBE condition may be met, or met at a relaxed level.

A base station may signal to a UE (e.g., by control signaling) a set of one or more communication parameters for communicating one or more uplink transmissions. The UE may determine, based on the set of communication parameters, if a power leakage (e.g., into adjacent frequency resources) is likely to exceed a threshold power leakage level. The UE may determine the likely power leakage based on the set of communication parameters. For example, the likely power leakage may be based on communication parameters such as the resources allocated to the UE for the uplink transmission, a transmission time interval (TTI) associated with the uplink transmission, a modulation coding scheme (MCS), or the channel quality. If the UE determines that the one or more of the communication parameters satisfies at least one parameter criterion for operating in a high transmission efficiency operating mode, the UE may select to operate in the high transmission efficiency operating mode. Additionally, if the UE determines that the one or more communication parameters fails to satisfy the parameter criterion for operating in the high transmission efficiency operating mode, the UE may select to operate in a lower transmission efficiency operating mode. Thus, the UE may select a transmission efficiency operating mode based on a likely power leakage associated with the uplink transmission.

The higher transmission efficiency operating mode may be associated with operating a power amplifier of the UE at higher power efficiency. That is, when the UE is operating at the higher transmission efficiency operating mode, the UE may transmit an uplink transmission at a higher power level that is more power efficient when compared to an uplink transmission made by the UE operating at the lower transmission efficiency operating mode. In some cases, operating the power amplifier according to the higher transmission efficiency operating mode may include operating the power amplifier closer to a saturation voltage of the power amplifier. In some cases, to decrease the nonlinearity, the UE may operate the power amplifier less close to the saturation level. As a result, the signal output from the power amplifier operating according to the higher transmission efficiency operating mode may undergo a more non-linear transformation when compared to a signal output from the power amplifier operating according to the lower transmission efficiency operating mode. If the UE determines to operate in the higher transmission efficiency operating mode, the UE may indicate the higher transmission efficiency operating mode to the base station. Based on receiving the indication from the UE, the base station may perform a filter process (e.g., a non-linear interference cancellation) on the uplink transmission. That is, the uplink transmission may be associated with a larger non-linear transformation when compared to an uplink transmission received from a UE operating in the lower transmission efficiency operating mode. The filtering process may increase a reliability of decoding the uplink transmissions.

Aspects of the disclosure are initially described in the context of a wireless communications system. Additionally, aspects of the disclosure are illustrated through additional wireless communication systems, power amplifier configurations, a signal function, an uplink transmission power distribution, a filter configuration, filter output, and a process flow. Aspects of the disclosure are further illustrated by and described with reference to apparatus diagrams, system diagrams, and flowcharts that relate to UE operation in a high efficiency transmission operating mode.

FIG. 1 illustrates an example of a wireless communications system 100 that supports UE operation in a high efficiency transmission operating mode in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). For example, wireless communications system 100 may operate using sub-6 GHz spectrum bands. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may be capable of operating in a first transmission efficiency operating mode that has a higher efficiency than a second transmission efficiency operating mode. The first transmission efficiency operating mode may be more power amplifier efficient and associated with a higher emission level (e.g., a transmission power emission level) than the second transmission efficiency operating mode. The UE 115 may receive control signaling from a base station indicating the communication parameters for subsequent uplink transmissions. The UE 115 may determine whether one or more of the communication parameters satisfy one or more parameter criterion for operating in the first transmission efficiency operating mode. If the UE 115 determines that one or more of the communication parameters fails to satisfy the one or more parameter criterion, the UE 115 may refrain from operating in the first transmission efficiency operating mode and may instead select to operate in the second transmission efficiency operating mode. Additionally, if the UE 115 determines that one or more of the communication parameters satisfies the one or more parameter criterion, the UE 115 may select to operate in the first transmission efficiency operating mode. The UE 115 may then operate a power amplifier of the UE 115 according to the selected transmission efficiency operating mode.

Figure 2:
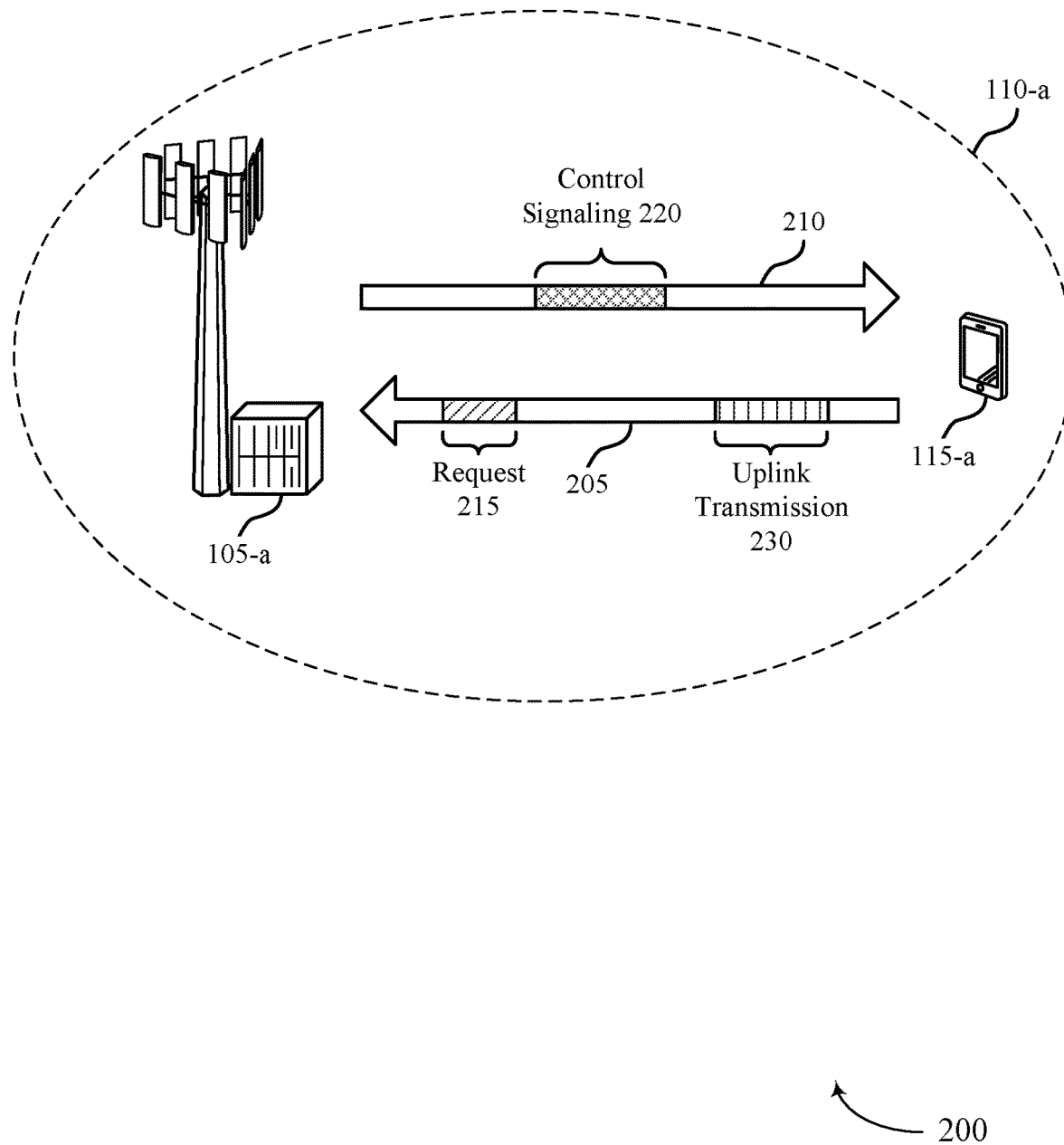
FIGS. 2 and 3 illustrate examples of wireless communications systems that support UE operation in a high efficiency transmission operating mode in accordance with aspects of the present disclosure.

FIG. 2 illustrates an example of a wireless communications system 200 that supports UE operation in a high efficiency transmission operating mode in accordance with aspects of the present disclosure. In some examples, wireless communications system 200 may implement aspects of wireless communications system 100. UE 115-*a* may be within a geographic coverage area 110-*a* of the base station 105-*a*. UE 115-*a* may communicate with base station 105-*a* by uplink channel 205 and downlink channel 210. The wireless communications system 200 may include communications by a sub-6 Hz spectrum band. Additionally, the wireless communications system 200 may include communications in mmW bands (e.g., between 30 GHz and 300 GHz).

The base station 105-*a* may transmit control signaling 220 by downlink channel 210 to the UE 115-*a*. The control signaling 220 may indicate parameters to the UE 115-*a* for the uplink transmission 230. For example, the control signaling 220 may indicate frequency resources for the uplink transmission 230 (e.g., a bandwidth part (BWP) bandwidth, a frequency location of a BWP). The allocated BWP may be within a channel or band. For example, a band may span 80 megahertz (MHz) or 100 MHz and each BWP may span 10 MHz. Here, the frequency resources may indicate the 10 MHz size of the BWP and a location of the BWP within the band. Additionally or alternatively, the parameters may indicate the uplink modulation coding scheme (MCS) for the uplink transmission 230. For example, the parameters may indicate QPSK, pi/2 BPSK, or a maximum physical uplink control channel (PUCCH) coding rate. In some cases the parameters may indicate timing parameters associated with the uplink transmission 230. For example, the parameters may indicate an N2 capability or a minimum K2 (e.g., indicating an amount of time, in slots or symbol periods, between the control signaling 220 and the uplink transmission 230).

When the UE 115-*a* transmits the uplink transmission 230, a power leakage may occur that results in power for one of the uplink transmissions 230 to spill into other frequency resources outside than the configured frequency resources for the uplink transmissions 230. Examples of other frequency resources may be adjacent frequency resources or channels, other channels within an operator's bandwidth, other channels of other systems, channels that include out of band harmonics of a power amplifier of the UE 115-*a* (e.g., where such channels are used by different operators), etc. The power leakages may be measured by an adjacent channel leakage ratio (ACLR) emissions test that identifies whether power (e.g., and how much power) leaks into the adjacent frequency resources. If the UE 115-*a* fails one or more ACLR emissions (e.g., power leaks into an adjacent channel), the UE 115-*a* may refrain from transmitting one or more corresponding uplink transmissions to reduce chances that the UE 115-*a* jams or interferes with nearby UEs 115 or UEs 115 using the adjacent frequency resources. In some cases, the power leakage may be more prevalent at the edges of the configured frequency resources, where the transmission power is more susceptible to leaking into the adjacent frequency resources based on being closer to the adjacent frequency resources. Additionally, the power leakages may be measured by an in-band emissions (IBE) test that identifies whether power (e.g., and how much power) leaks into the adjacent frequency resources within a same channel as frequency resources allocated to the uplink transmission 230. If the UE 115-*a* fails one or more IBE emissions (e.g., power leaks into adjacent frequency resources within a same channel), the UE 115-*a* may refrain from transmitting the uplink transmission 230 or may transmit the uplink transmission 230. If the UE 115-*a* transmits the uplink transmission 230, the base station 105-*a* may perform filtering on the received uplink transmission 230 to reduce jams or interferences with nearby UEs 115.

In some cases, it may be desirable to transmit uplink transmissions 230 that pass IBE or ACLR tests and are associated with high power efficiency. In some cases, a UE 115 may use a power amplifier to amplify a radio frequency (RF) signal prior to transmitting it. Operating the power amplifier closer to a saturation voltage of the power amplifier by increase an efficiency of the power amplifier. However, as the bias voltage increases, a nonlinearity of the output signal (e.g., the amplified signal) may also increase. In some cases, to decrease the nonlinearity, the UE 115-*a* may operate the power amplifier less close to the saturation level. To ensure that the output power meets a peak pout power (Pout), the UE 115 may use a bigger power amplifier associated with a higher peak current draw and worse thermal qualities and higher cost. Achieving higher efficiency at Pout translates to lower peak battery currents (e.g., within a power amplifier), improved thermal, greater efficiency, etc., for the UE 115-*a*.

The UE 115-*a* may be capable of operating according to more than one transmission efficiency operating mode. For example, the UE 115-*a* may be capable of operating according to a higher transmission efficiency operating mode and a lower transmission efficiency operating mode. The higher transmission efficiency operating mode (e.g., a sub-band high efficiency transmitter (SETI) uplink method) may be associated with operating a power amplifier of the UE 115-*a* closer to a saturation level. When the UE 115-*a* operates the power amplifier closer to the saturation level, the power efficiency may be higher and a signal (e.g., transmitted within the uplink transmission 230) may be associated with an increased nonlinearity when compared to a signal generated by a power amplifier operated farther from a saturation level. Additionally, power leakages associated with uplink transmissions 230 from a UE 115-*a* operating in the higher transmission efficiency operating mode may be greater when compared to power leakages associated with uplink transmissions 230 from a UE 115-*a* operating in a lower transmission efficiency operating mode. Thus, a UE 115-*a* operating in the higher transmission efficiency operating mode may be associated with a lower error vector magnitude (EVM), a lower supportable MCS, and a higher IBE. Further, if the UE 115-*a* transmits the uplink transmission 230 near a channel bandwidth edge, the uplink transmission 230 may be associated with a higher ACLR.

The UE 115-*a* may further be capable of operating according to a lower transmission efficiency operating mode. Here, the uplink transmission 230 may be associated with an increased performance (e.g., a high EVM, higher MCS such as 256 QAM). Here, the UE 115-*a* may bias the power amplifier further from the saturation level.

The base station 105-*a* may indicate to the UE 115-*a* if the UE 115-*a* is allowed to operate in the higher transmission efficiency operating mode. That is, the UE 115-*a* may signal to the base station 105-*a* that the UE 115-*a* is capable of operating at more than one transmission efficiency operating mode. In some cases, the UE 115-*a* may further signal a preferred transmission efficiency operating mode (e.g., within the request 215). The base station 105-*a* may determine if the parameters for the uplink transmission 230 will enable the UE 115-*a* to successfully transmit the uplink transmission 230. For example, the base station 105-*a* may allow the UE 115-*a* to operate in the higher transmission efficiency operating mode if the UE 115-*a* is in a noise floor (e.g., low MCS) or if the uplink channel 205 is unloaded (e.g., and IBEs do not affect other uplink transmissions 230). In some cases, the base station 105-*a* may configure the UE 115-*a* to operate in the higher transmission efficiency operating mode. Here, the base station 105-*a* may configure the UE 115-*a* to operate in the higher transmission efficiency operating mode (e.g., by MAC-CE or L1 signaling) or the UE 115-*a* may infer the indication from a bandwidth part assignment (e.g., within the control signaling 220). If the base station 105-*a* allows the UE 115-*a* to operate in the higher transmission efficiency operating mode, the base station 105-*a* may restrict a subband assignment (e.g., an uplink BWP) of the uplink transmission 230 to avoid edges of the channel bandwidth.

The UE 115-*a* may autonomously and dynamically decide whether to operate in the high transmission efficiency operating mode. For example, the UE 115-*a* may decide whether to operate in the higher transmission efficiency operating mode based on implementation details, scheduling parameters (e.g., dynamic scheduling information), or both. In this case, the UEs 115-*a* decision to operate in the higher transmission efficiency operating mode may be transparent to the base station 105-*a*.

The parameters associated with the uplink transmission 230 may enable the UE 115-*a* to determine if an uplink transmission 230 generated by the UE 115-*a* operating according to the higher transmission efficiency operating mode is likely to fail one or more power leakage tests (e.g., an ACLR test, an IBE test). The UE 115-*a* may determine if one or more of the parameters satisfy one or more parameter criterion. Parameters that satisfy a parameter criterion may indicate that an uplink transmission 230 generated according to the higher transmission efficiency operating mode is less likely to fail an ACLR test. For example, the UE 115-*a* may determine that a parameter indicates a low MCS for the uplink transmission 230. This parameter may satisfy the parameter criterion, which may indicate that the uplink transmission 230 generated according to the higher transmission efficiency operating mode is less likely to fail the ACLR test (e.g., when compared to an uplink transmission with a parameter indicating a higher MCS). In another example, the UE 115-*a* may determine that a parameter indicates a small bandwidth for the uplink transmission 230. This parameter may satisfy the parameter criterion while a parameter that indicates a larger bandwidth may fail to satisfy the parameter criterion. In another example, the UE 115-*a* may determine that the parameter indicates a higher allowed IBE which may satisfy the parameter criterion (while a parameter indicating a normal or lower allowed IBE may fail to satisfy the parameter criterion). In another example, the UE 115-*a* may determine that resources allocated for the uplink transmission 230 are in the middle of a channel bandwidth, which may satisfy a parameter criterion (e.g., an uplink transmission 230 transmitted in the middle of the channel bandwidth may be less likely to fail the ACLR test).

The UE 115-*a* may transmit a request 215 indicating preferred parameters for the uplink transmission 230. In some cases, the UE 115-*a* may indicate preferred parameters that meet criteria for operating the UE 115-*a* according to the higher transmission efficiency operating mode. For example, the UE 115-*a* may request preferred BWP bandwidth and frequency location such as an uplink BWP that is away from an edge of the band (e.g., at least a threshold distance away from the band edge). An uplink transmission 230 that is transmitted within frequency resources away from an edge of a channel bandwidth may be less likely to fail an ACLR test than an uplink transmission 230 that is transmitting within frequency resources allocated near an edge of the channel bandwidth. The UE 115-*a* may request parameter to be assigned an uplink BWP that is narrower (e.g., 8 MHz, 10 MHz). That is, an uplink transmission 230 that is narrower is more likely to satisfy one or more of an ACLR and an IBE level when compared to an uplink transmission 230 that is wider. In some cases, the base station 105-*a* may select parameters (e.g., indicated by control signaling 220) based on parameters requested by the UE 115-*a* within the request 215.

The UE 115-*a* may be configured with subband level maximum transmit power (PC max) configurations. The maximum transmit power of the UE 115-*a* for different subbands may be symmetric from a center of the uplink bandwidth channel or band. For example, the center subband may have a maximum transmit power of 20 decibel milliwatts (dBms) and subbands 5 MHz away from the center subband may have a maximum transmit power of 15 dBms. The maximum transmit power for subbands may decrease from the center subband of the channel or band. For example, a maximum transmit power for a subband on a band edge may be 10 dBms while a center subband maximum transmit power may be 20 dBms and subbands in between the center subband and the edge subbands may be 15 dBms. The base station 105-*a* may allocate resources for the uplink transmission 230 associated with a higher maximum transmit power. Thus, the UE 115-*a* may increase a likelihood that the resources allocated for the uplink transmission 230 are farther from an edge of the channel or band and thus increase a likelihood that the UE 115-*a* may transmit the uplink transmission 230 while operating at a high transmission efficiency operating mode. In another aspect, UE 115-*a* may be able to reach a higher transmit power level within a center subband with high transmission efficiency mode which is otherwise unattainable in normal transmission efficiency mode. For example, a maximum transmit power for a subband on a band edge may be 23 dBms while the maximum transmit power for a subband in the center bandwidth may be 26 or 29 dBms.

The UE 115-*a* may transmit a power headroom report based on a maximum transmit power for each of the subbands. Power headroom may be calculated based on the maximum transmit power of a subband. There may be two modes of power headroom reporting. In a first mode (e.g., an actual power headroom report), the UE 115-*a* may calculate the power headroom based on a recent uplink grant (e.g., included in the control signaling 220). Here, the power headroom report may be based on a number of resource blocks in the grant, which may span multiple bands. In some cases, the UE 115-*a* may calculate a power headroom report for the full subbands (E.g., the entire channel, the entire band) and may calculate the power headroom report for partial subbands separately. In a second mode (e.g., a virtual power headroom report), the UE 115-*a* may calculate the power headroom based on pre-defined parameter values (e.g., a reference PUSCH). The UE 115-*a* may transmit the power headroom report by a media access control (MAC) control element. There may be one MAC control element per carrier (e.g., band, channel). Alternatively, there may be one field for each subband within each carrier.

The UE 115-*a* may determine that one or more of the parameters satisfies one or more parameter criterion. Here, the UE 115-*a* may select to operate in the higher transmission efficiency operating mode. The UE 115-*a* may generate the uplink transmission 230 by operating a power amplifier according to the higher transmission efficiency operating mode and transmit the uplink transmission 230 to the base station 105-*a* by the uplink channel 205. Additionally or alternatively, the UE 115-*a* may determine that one or more of the parameters fails to satisfy one or more parameter criterion. Here, the UE 115-*a* may select to operate in the lower transmission efficiency operating mode. The UE 115-*a* may generate the uplink transmission 230 by operating the power amplifier according to the lower transmission efficiency operating mode and transmit the uplink transmission 230 to the base station 105-*a* by the uplink channel 205. In some cases, the UE 115-*a* may indicate (e.g., by a mode indicator) to the base station 105-*a* if the UE 115-*a* selects to operate in the higher transmission efficiency operating mode.

The base station 105-*a* may receive the uplink transmission 230. The base station 105-*a* may determine that the UE 115-*a* is going to transmit the uplink transmission 230 according to the higher transmission efficiency operating mode. For example, the UE 115-*a* may indicate to the base station 105-*a* that the UE 115-*a* is operating at a higher transmission efficiency operating mode. In another example, the base station 105-*a* may have indicated (e.g., allowed) to the UE 115-*a* to operate in the higher transmission efficiency operating mode. In either case, the base station 105-*a* may perform sophisticated interference cancellation on the uplink transmission 230 based on the UE 115-*a* operating in the higher transmission efficiency operating mode. This may allow the base station 105-*a* to remove emissions due to the higher transmission efficiency operating mode.

Figure 3:
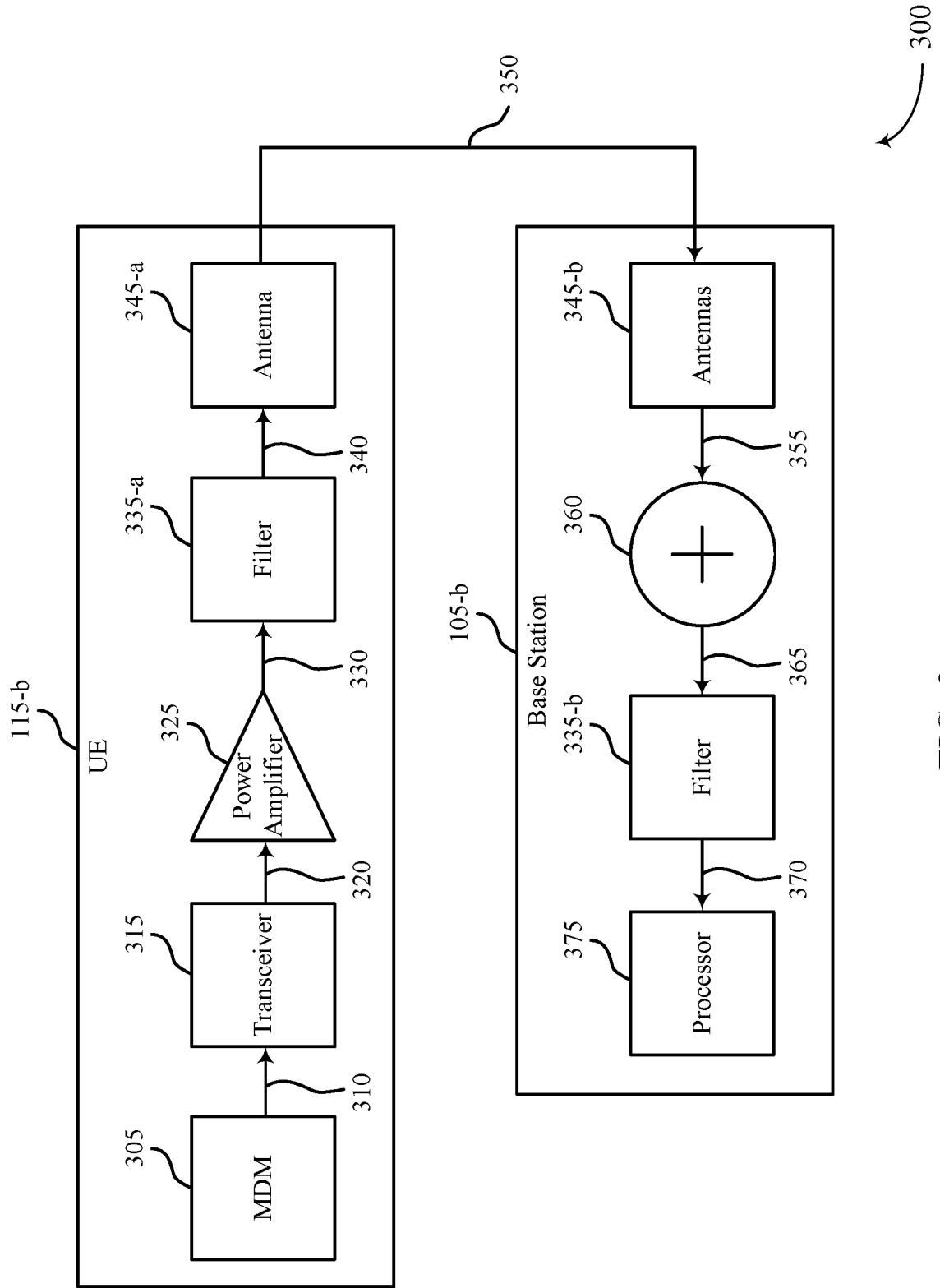

FIG. 3 illustrates an example of a wireless communications system 300 that supports UE operation in a high efficiency transmission operating mode in accordance with aspects of the present disclosure. In some examples, wireless communications system 300 may implement aspects of wireless communications systems 100 or 200. The UE 115-*b* may be capable of operating in a higher transmission efficiency operating mode and a low transmission efficiency operating mode. The UE 115-*b* may transmit uplink transmission 350 to the base station 105-*b* by antenna 345-*a* while operating in either the high transmission efficiency operating mode or the low transmission efficiency operating mode. The base station 105-*b* may receive the uplink transmission 350 by one of the antennas 345-*b*.

The UE 115-*b* may include a mobile device modem (MDM) 305, a transceiver 315, a power amplifier 325, a filter 335-*a*, and an antenna 345-*a*. The UE 115-*a* may generate a digital signal 310 to be communicated to the base station 105-*b* within the uplink transmission 350. The transceiver 315 (e.g., a transmitter) may receive the digital signal 310 and output an RF signal 320 to the power amplifier 325. The power amplifier 325 may be configured to support a high transmission efficiency operating mode, a normal transmission efficiency operating mode, or a low transmission efficiency operating mode (e.g., associated with good EVM). In some cases, the power amplifier 325 may distort the RF signal 320 to generate the amplified RF signal 330. For example, the power amplifier 325 may perform a transfer function H on the RF signal 320 to generate the amplified RF signal 330. The power amplifier 325 may output the amplified RF signal 330 to filter 335-*a*. The filter 335-*a* may be a band pass filter and may output the filtered RF signal 340 to the antenna 345-*a*. The antenna 345-*a* may receive the filtered RF signal 340 and transmit the uplink transmission 350 to the base station 105-*b*. In some cases, the UE 115-*b* may include more than one antenna 345-*a*. Here, the UE 115-*b* may select one or more antennas 345-*a* to transmit the uplink transmission 350 to the base station 105-*b*.

The base station 105-*b* may receive, by one or more of the antennas 345-*b*, the uplink transmission 350. The antennas 345-*b* may each output received uplink transmissions 355 to the summation component 360 which may combine each of the uplink signals received by the antennas 345-*b*. The combined uplink transmissions 365 may be received by the filter 335-*b*. The filter 335-*b* may be a receiving nonlinear linearizer. In some cases, the filter 335-*b* may perform an inverse transfer function on the combined uplink signals 365 than a transfer function performed by the power amplifier 325. For example, if the power amplifier 325 performs a transfer function $H_p$ on the RF signal 320 to generate the amplified RF signal 330, the filter 335-*b* may perform a transfer function $H_p^{-1}$ on the combined uplink transmissions 365 to generate the filtered uplink transmissions 370. The filter 335-*b* may output the filtered uplink transmissions 370 to processor 375 (e.g., for decoding).

The UE 115-*b* may determine to operate in a higher transmission efficiency operating mode. In some cases, the UE 115-*b* may determine to operate in the higher transmission efficiency operating mode based on receiving communication parameters from the base station 105-*b* for the uplink transmission 350. The UE 115-*b* may determine that one or more of the communication parameters meets parameter criterion and select the higher transmission efficiency operating mode based on determining. When the UE 115-*b* selects to operate in the higher transmission efficiency operating mode, the UE 115-*b* may adjust an operation of the power amplifier 325. For example, the UE 115-*b* may operate the power amplifier 325 at a saturation power. When the UE 115-*b* selects to operate in the higher transmission efficiency operating mode, the UE 115-*b* may adjust an operation of the transceiver 315 by adjusting one or more control parameters associated with the transceiver 315. For example, the transceiver 315 may be operated to compress the digital signal 310 (e.g., the baseband signal may be compressed) to compensate for the decreased transmission power gain (e.g., due to operating the power amplifier 325 at a saturation power). Here, a control parameter may indicate for the transceiver 315 to operate in the higher efficiency operating mode and may, in some cases, indicate a compression factor associated with the transceiver 315. Compressing the baseband signal may result in a less costly current requirement as a digital to analog converter (e.g., within the transceiver 315). In some cases, the digital signal 310 may not be compressed and the power amplifier 325 may compress and gain the RF signal 320. Here, an additional gain stage may be added to the power amplifier 325. For example, an RF gain stage may be added for an output power greater than 26 dBms. In some cases, the power transmission gain at the saturation power may result in a lower power amplifier gain. The power of the amplified signal RF 330 may be controlled by the power amplifier 325. In some other cases, the output power of the amplified RF signal 330 may be controlled by a power amplifier 325 bias. The MDM 305 may output control signaling to the transceiver 315 and the power amplifier 325 to control a mode (e.g., a transmission efficiency operating mode), gain, output power of the amplified RF signal 330, power amplifier 325 bias voltage, or other parameters.

Figure 4:
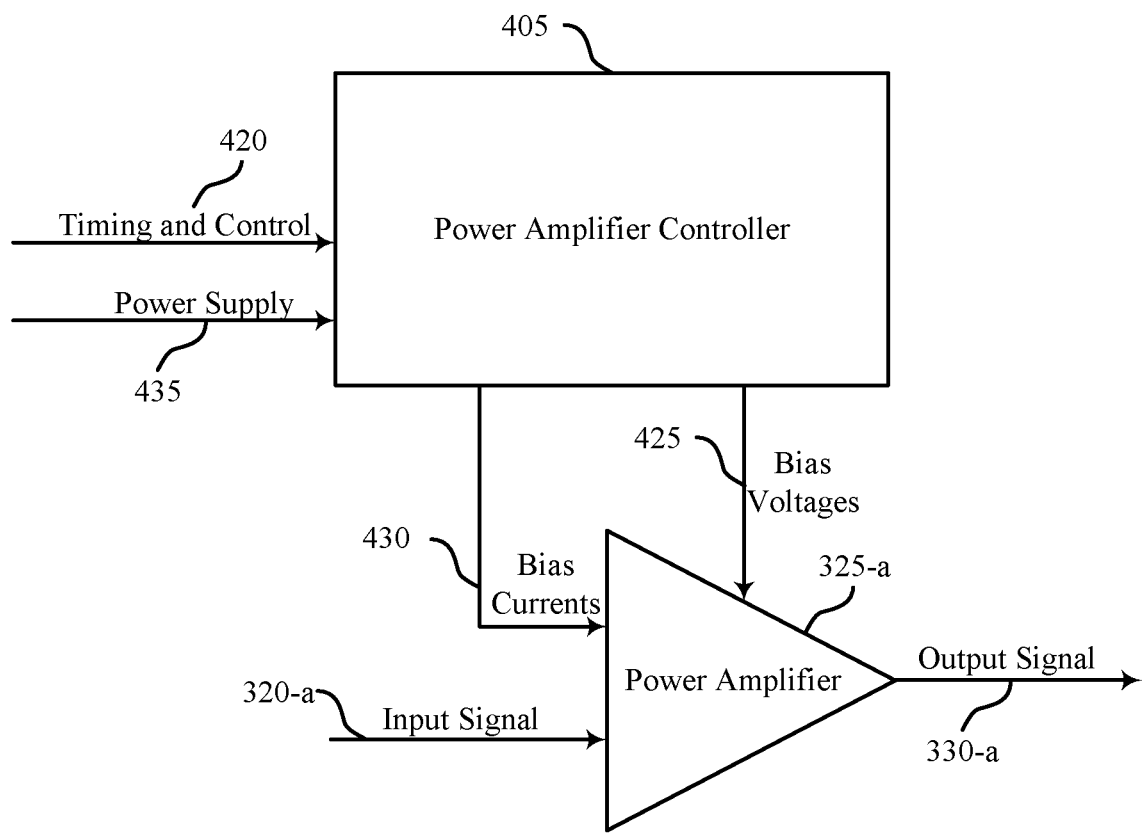
FIG. 4 illustrates an example power amplifier configuration that supports UE operation in a high efficiency transmission operating mode in accordance with aspects of the present disclosure.

FIG. 4 illustrates a power amplifier configuration 400. In some examples, power amplifier configuration 400 may implement aspects of wireless communications systems 100, 200, of 300. For example, a UE 115 as described with reference to FIGS. 1 through 3 may implement power amplifier configuration 400. In some cases, input signal 320-a may be an example of an RF signal 320 as described with reference to FIG. 3 and output signal 330-a may be an example of an amplified RF signal 330 as described with reference to FIG. 3. Power amplifier configuration 400 may include power amplifier 325-a and power amplifier controller 405.

The power amplifier configuration 400 may support more than one efficiency transmission operating mode (e.g., a low efficiency transmission operating mode associated with good EVM, a normal efficiency transmission operating mode, and a high efficiency transmission operating mode). The power amplifier 325-a design (e.g., illustrated by power amplifier configuration 400) may have an adaptable power amplifier 325-a biasing to allow the power amplifier 325-a to operate in each of the one or more modes. For example, a first bias voltage 425 may cause the power amplifier 325-a to operate in a high (e.g., good) EVM mode associated with low EVM. Here, the power amplifier 325-a may operate similar to a class A power amplifier 325-a. In another example, a second bias voltage 425 may cause the power amplifier 325-a to operate in a normal efficiency transmission operating mode. Here, the power amplifier 325-a may be associated with a low peak-to-average-power ratio and may operate similar to a class A or class B power amplifier 325-a. In another example, a third bias voltage 425 may cause the power amplifier 325-a to operate in an efficiency transmission operating mode or subband high efficiency transmitter (SETI) mode. Here, the power amplifier 325-a may operate similar to a class C-F power amplifier 325-a.

The power amplifier controller 405 may control an efficiency transmission operating mode of the power amplifier 325-a. The power amplifier controller 405 may receive a timing and control signal 420 and a power supply 435 (e.g., a Vbat). In some cases, the timing and control signal 420 may be received from an MDM as described with reference to FIG. 3. The power supply 435 may enable power amplifier controller 405 to supply the bias voltages 425 and the bias currents 430 to the power amplifier 325-a. The timing and control signal 420 may include a baseband envelope or adaptable biasing signal 420. The timing and control signal 420 may further include one or more control parameters such as a bias state for the power amplifier 325-a, a power level for the output signal 330-a, and a change timing mode signal.

The power amplifier controller 405 may receive the timing and control signal 420 and determine the appropriate bias voltages 425 and bias currents 430 to supply to the power amplifier 325-a to generate the indicated output signal 330-a. For example, the timing and control signal 420 may indicate which efficiency transmission operating mode to select by indicating a bias state for the power amplifier 325-a. The power amplifier controller 405 may drive one or more power amplifier 325-a bias gates by applying the bias voltages 425 to the bias gate of the power amplifier 325-a based on the bias state for the power amplifier 325-a. For example, the power amplifier 325-a may include a gate and a drain component. The power amplifier controller 405 may apply a bias voltage 425 to one or both of the gate and drain components to cause the power amplifier 325-a to operate in the efficiency transmission operating mode indicated by the timing and control signal 420. Additionally, the timing and control signal 420 may indicate a power level for the output signal 330-a.

The power amplifier 325-a may receive an input signal 320-a (e.g., an RF signal) and output the output signal 330-a (e.g., an amplified RF signal). In some cases, the power amplifier 325-a may be associated with a nonlinear transfer function. That is, the input signal 320-a may be nonlinearly filtered by the power amplifier 325-a to generate the output signal 330-a. An amount of nonlinear distortion associated with the output signal 330-a may be based on the bias voltage 425. That is, as the bias voltage 425 increases, the amount of nonlinear distortion may also increase. In some cases, as the bias voltage 425 increases, the efficiency of the power amplifier 325-a decreases. Applying the bias voltages 425 to the power amplifier 325-a may draw small bias currents 430. Thus, increasing one or more of the bias voltages 425 (e.g., to operate the power amplifier 325-a at or near a saturation state) may not result in a large increase in the bias currents 430, resulting in a high power efficiency.

Figure 5:
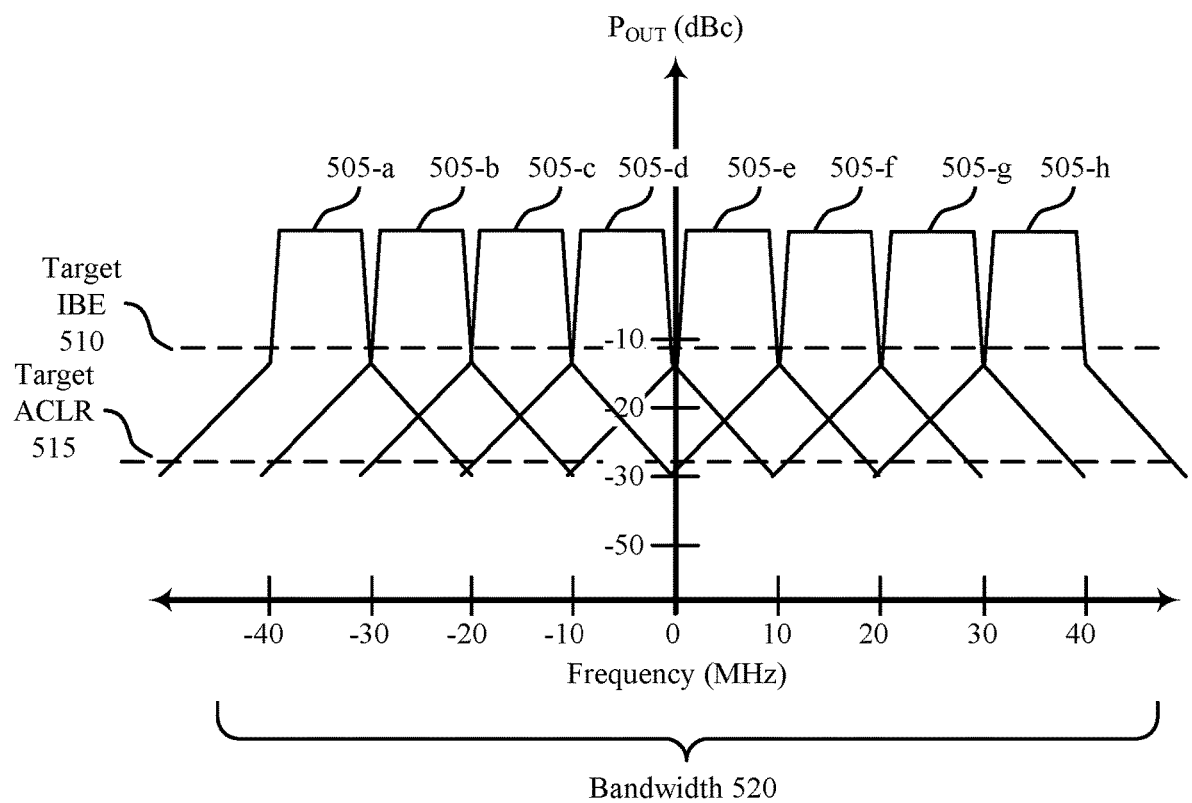
FIG. 5 illustrates an example of uplink transmission power distributions that support UE operation in a high efficiency transmission operating mode in accordance with aspects of the present disclosure.

FIG. 5 illustrates an example of an uplink transmission power distribution 500 that supports UE operation in a high efficiency transmission operating mode in accordance with aspects of the present disclosure. In some examples, FIG. 5 may implement aspects of wireless communications systems 100, 200, and 300, as well as power amplifier configuration 400. The uplink transmission power distribution 500 may illustrate one or more individual uplink power distribution waveforms 505. In some cases, the waveforms 505 may correspond to a set of frequency resources and may span a quantity of resource blocks and may be associated with an uplink transmission. For example, a UE 115 may transmit waveform 505-a if the UE 115 was allocated a 10 MHz bandwidth centered around an offset frequency of −35 MHz from the center of the channel bandwidth 520. In another example, a UE 115 may transmit waveform 505-e if the UE 115 was allocated a 10 MHz bandwidth centered around an offset frequency of 5 MHz from the center of the channel bandwidth 520.

A majority of the power for each waveform 505 may be centered around the center frequency of an allocated bandwidth and the power of each waveform 505 may decrease as a distance from the allocated resources increases. In some cases, there may be a target IBE 510 associated with the bandwidth 520 and a target ACLR 515 associate with other bandwidths outside of or adjacent to bandwidth 520. The target IBE 510 may correspond to a maximum power level of power leakage to adjacent subbands within the bandwidth 520. The target ACLR 515 may correspond to a maximum power level of power leakage to adjacent bandwidths 520. In some cases, a UE 115 may determine that waveform 505-a may not meet the target ACLR 515 as the power level of the waveform 505-a may be greater than the target ACLR 515 at the edge of bandwidth 520. The UE 115 may determine that waveform 505-b meets the target ACLR 515 as the power level of waveform 505-b falls below the target ACLR 515 within the bandwidth 520. In some cases, subbands closer to the center of bandwidth 520 may be more likely to meet the target ACLR 515.

A waveform 505 may change shapes based on an efficiency transmission operating mode. For example, an angle of the slop of the waveform 505 may be steeper in a lower efficiency transmission operating mode and may be more gradual in a higher efficiency transmission operating mode. Thus, a waveform 505 associated with a UE operating in a lower efficiency transmission operating mode may be more likely to meet target IBE 510 and target ACLR 515 than a waveform 505 associated with a UE operating in a higher efficiency transmission operating mode. The UE 115 may determine, based on communication parameters such as frequency resources, coding complexity, and timing whether the target IBE 510 and target ACLR 515 may be met if the UE 115 operates according to the higher efficiency transmission operating mode. If the UE 115 determines that the waveforms 505 are likely to meet the target IBE 510 and target ACLR 515 (e.g., based on one or more of the communication parameters meeting communication criterion), the UE 115 may select to operate in the higher efficiency transmission operating mode.

Figure 6A:
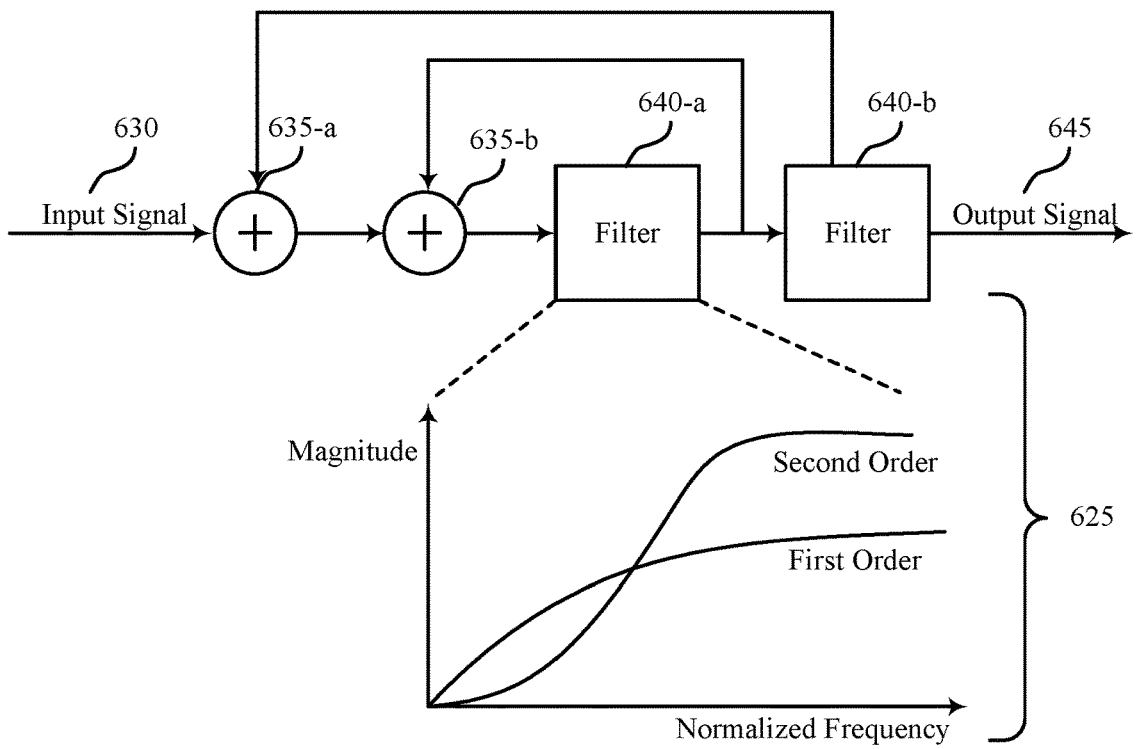
FIGS. 6A and 6B illustrate examples of a filter configuration and filter output that support UE operation in a high efficiency transmission operating mode in accordance with aspects of the present disclosure.
Figure 6B:
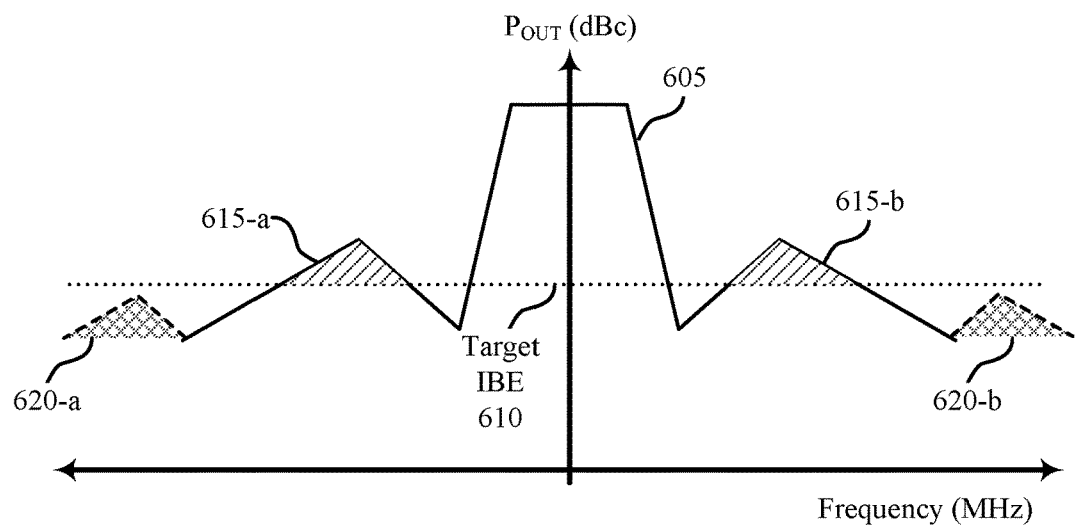

FIGS. 6A and 6B illustrate an example of a filter configuration 600 and an uplink transmission power distribution 601, respectively, that each support UE operation in a high efficiency transmission operating mode in accordance with aspects of the present disclosure. In some examples, a UE 115 may utilize the filter configuration 600 to generate the waveform 605 illustrated in the uplink transmission power distribution 601. In some cases, a UE 115 may use the filter configuration 600 to generate the waveform 605 when the UE is operating in a higher efficiency transmission operating mode.

FIG. 6A illustrates the filter configuration 600 may be in a UE 115. For example, the UE 115 may have the filter configuration 600 in a transceiver (e.g., before a mixer). The filter configuration 600 may increase a likelihood that uplink transmissions (e.g., generated by a UE operating in the higher efficiency transmission operating mode) meet IBE specifications. The filter configuration 600 may be an example of a delta-sigma modulator and may be configured to perform sigma-delta modulator shaping. The delta-sigma modulator may shape noise associated with an uplink transmission such that in-band distortion may be lowered and out of band distortion may be magnified. In some cases the filter configuration 600 may shape emissions (e.g., noise and unwanted emissions).

The filter configuration 600 may include dithering circuitry to shape the in-band distortion. Similar to the delta-sigma modulator, dithering circuitry may be applied to an input signal 630 prior to input to the power amplifier to shape the in-band distortion. In some examples, the delta-sigma modulator, the dithering circuitry, or both, may be shape a signal prior to input to the power amplifier, such that undesired portion of the signal generated by the power amplifier to spread the distortion. For example, the distortion may be spread within the in-band portion of the signal, to an adjoining band, a level of distortion in one band (e.g., in-band) may be reduced at the cost of increasing a level of distortion in another band (e.g., out of band).

The filter configuration 600 may receive an input signal 630 and propagate the signal through the filter 640-*a*. The input signal 630 may be baseband aligned to increase an amount of shaping benefit. That is, for all resource block allocations, the input to the transceiver (e.g., transceiver 315) may be band centered. If the input is not band centered, the input signal 630 may be shifted and the output signal 645 may be shifted back. The first order of graph 625 below may illustrate how the input signal 630 is filtered after a first pass through the filter 640-*a*. The filter 640-*a* may be associated with a transfer function $\alpha z^{-1}$. In some cases, filtered input signal may be directed through the filter 640-*a* again. The second order of graph 625 below may illustrate how the signal is filtered after a second pass through the filter 640-*a*. The filter 640-*a* may be coupled with a second filter 640-*b* that may be a high pass filter.

FIG. 6B illustrates an uplink transmission power distribution 601 that may have been shaped by the filter configuration 600. In some cases, the waveform 605 may have undergone successive peak cancellation to improve the IBE of the waveform 605. For example, the portions 615 of the waveform 605 may be portions that exceeded a target IBE 610 prior to the successive peak cancellation. As a result of the successive peak cancellation, the power associated with the portions 615 may be shifted to other portions of the waveform 605, such as portions 620. Thus, the power included within the waveform 605 remains unchanged, but the distribution allows for the target IBE 610 to be met. A UE may use successive peak cancellation (e.g., when operating in a higher efficiency transmission operating mode) to increase a likelihood that the target IBE 610 is met. The resulting waveform 605 may be noise and emissions shaped. As a result, a power of the waveform 605 outside of a band may be lower than the target IBE 610.

Figure 7:
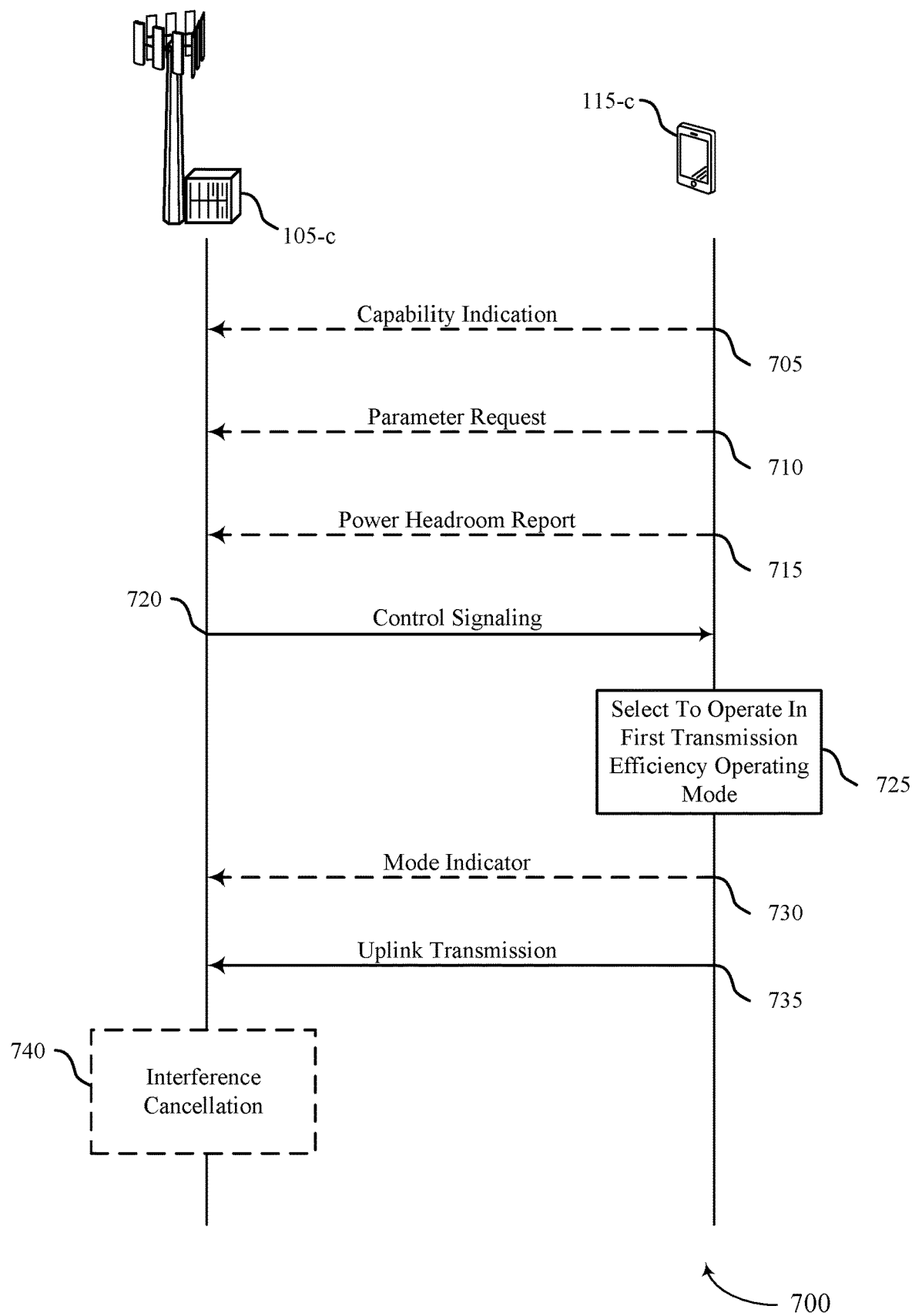
FIG. 7 illustrates an example of a process flow that supports UE operation in a high efficiency transmission operating mode in accordance with aspects of the present disclosure.

FIG. 7 illustrates an example of a process flow 700 that supports UE operation in a high efficiency transmission operating mode in accordance with aspects of the present disclosure. In some examples, process flow 700 may implement aspects of wireless communication systems 100.

A UE 115-*b* may be capable of operating according to a first transmission efficiency operating mode and a second transmission efficiency operating mode. The second transmission efficiency operating mode may be less power efficient than the first transmission efficiency operating mode and the first transmission efficiency operating mode may be associated with a first undesired emission level and the second transmission efficiency operating mode may be associated with a second undesired emission level that is lower than the first undesired emission level.

At 705, UE 115-*c* may optionally transmit a capability indication to the base station 105-*c*. That is, the UE 115-*c* may transmit an indication of a capability of the UE 115-*c* to operate according to the first transmission efficiency operating mode and the second transmission efficiency operating mode.

At 710, the UE 115-*c* may optionally transmit a parameter request. In some cases, the request indicates a requested bandwidth part, a requested frequency location relative to a band edge of a channel bandwidth, or both.

At 715, the UE 115-*c* may optionally transmit a power headroom request to the base station 105-*c*. In some cases, transmitting a power headroom report indicating maximum UE 115-*c* transmit power, power headroom, or both, for a plurality of subbands within a channel bandwidth, where the control signaling is received based at least in part on transmitting the power headroom report. In some examples, the UE 115-*c* may transmit a MAC control element that has a plurality of fields, each field of the plurality of fields indicating maximum UE transmit power, power headroom, or both, for a respective subband of the plurality of subbands per component carrier. The UE 115-*c* may transmit the power headroom report that indicates the maximum UE transmit power, the power headroom, or both, for each full subband of the plurality of subbands and maximum UE transmit power, power headroom, or both, for each partial subband of the plurality of subbands. The UE 115-*c* may transmit an actual power headroom report indicating maximum UE transmit power, power headroom, or both, for one or more resource blocks allocated in a grant. Additionally, the UE 115-*c* may transmit a virtual power headroom report indicating maximum UE transmit power, power headroom, or both, for one or more resource blocks based at least in part on at least one defined parameter value. The defined parameter value may indicate a reference physical uplink shared channel.

At 720, the base station 105-*c* may transmit control signaling to the UE 115-*c*. The control signaling may indicate at least one communication parameter for communicating an uplink transmission. In some cases, the control signaling may indicate the at least one communication parameter that is a scheduled uplink bandwidth part allocated for the uplink transmission, where the at least one parameter criterion is that the uplink bandwidth part satisfies a bandwidth threshold and is located at least a threshold distance away from a band edge of a channel bandwidth. Additionally, the control signaling may indicate the at least one communication parameter that is an uplink modulation and coding scheme allocated for the uplink transmission, where the at least one parameter criterion is that the uplink modulation and coding scheme satisfies a modulation and coding scheme threshold. In some instances, the control signaling may indicate the at least one communication parameter that is a scheduled frequency resource that is allocated for uplink transmission, where the at least one parameter criterion is that the scheduled frequency resource satisfies a bandwidth threshold and is located at least a threshold distance away from a band edge of a channel bandwidth. Additionally, the control signaling may indicate at least one parameter criterion is that the UE being capable of switching from the second transmission efficiency operating mode to the first transmission efficiency operating mode within the defined number of transmission time intervals.

At 725, the UE 115-c may select to operate in the first transmission efficiency operating mode based on a determination that the at least one communication parameter satisfies at least one parameter criterion for operating in the first transmission efficiency operating mode. For example, the UE 115-c may determine that a configured BWP or scheduled resource allocation has a bandwidth that is smaller than a threshold bandwidth. In another example, the UE 115-c may determine that a configured MCS (e.g., QPSK, pi/2 BPSK, max PUCCH code rate) meets or is below an MCS limit. In another instance, the UE 115-c may determine that a timing interval (e.g., N2, K2) is long enough for the UE 115-c to switch from a lower transmission efficiency operating mode to the higher transmission efficiency operating mode, or vice versa.

The UE 115-c may adjust at least one bias voltage and/or a bias current for the power amplifier to operate in the first transmission efficiency operating mode based on the selecting to operate in the first transmission efficiency operating mode and generate, by the power amplifier and a transmitter of the UE 115-c, the uplink transmission based at least in part on the adjusted bias voltage. In some cases, the UE 115-c may perform noise and emission shaping on a signal to generate a noise and emission shaped signal that has lower or shaped in-band distortion based on selecting to operate in the first transmission efficiency operating mode and generate, by the power amplifier, the uplink transmission based on the noise and emission shaped signal.

At 730, the UE 115-c may optionally transmit a mode indicator to the base station 105-c to indicate that the UE 115-c is operating in the first transmission efficiency operating mode.

At 735, the UE 115-c may transmit an uplink transmission to the base station 105-c. That is, the UE 115-c may transmit, based on the at least one communication parameter, the uplink transmission that is generated by operating a power amplifier of the UE in accordance with the first transmission efficiency operating mode.

At 740, the base station 105-c may optionally perform interference cancellation based on the mode indicator.

Figure 8:
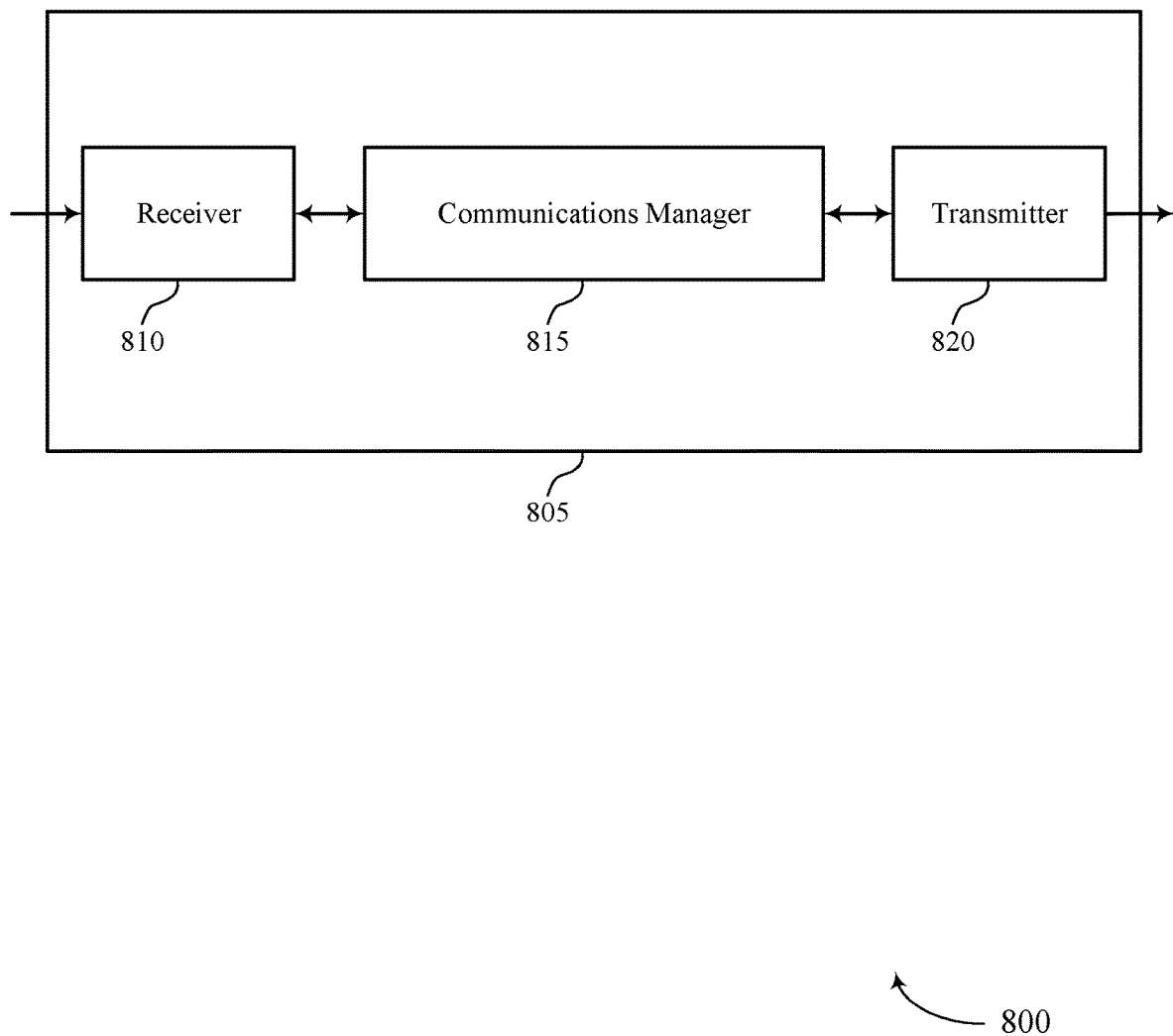
FIGS. 8 and 9 show block diagrams of devices that support UE operation in a high efficiency transmission operating mode in accordance with aspects of the present disclosure.

FIG. 8 shows a block diagram 800 of a device 805 that supports UE operation in a high efficiency transmission operating mode in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to UE operation in a high efficiency transmission operating mode, etc.). Information may be passed on to other components of the device 805. The receiver 810 may be an example of aspects of the radio 1120 described with reference to FIG. 11. The receiver 810 may utilize a single antenna or a set of antennas.

The communications manager 815 may receive, from a base station, control signaling that indicates at least one communication parameter for communicating an uplink transmission, select to operate in the first transmission efficiency operating mode based on a determination that the at least one communication parameter satisfies at least one parameter criterion for operating in the first transmission efficiency operating mode, and transmit, based on the at least one communication parameter, the uplink transmission that is generated by operating a power amplifier of the UE in accordance with the first transmission efficiency operating mode. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 815 as described herein may be implemented to realize one or more potential advantages. One implementation may allow a UE 115 to save power and increase battery life by increasing a power efficiency of a power amplifier operation. That is, the communications manager 815 may select a higher transmission efficiency operating mode to improve power efficiency.

The transmitter 820 may transmit signals generated by other components of the device 805. In some examples, the transmitter 820 may be collocated with a receiver 810 in a transceiver module. For example, the transmitter 820 may be an example of aspects of the radio 1120 described with reference to FIG. 11. The transmitter 820 may utilize a single antenna or a set of antennas.

Figure 9:
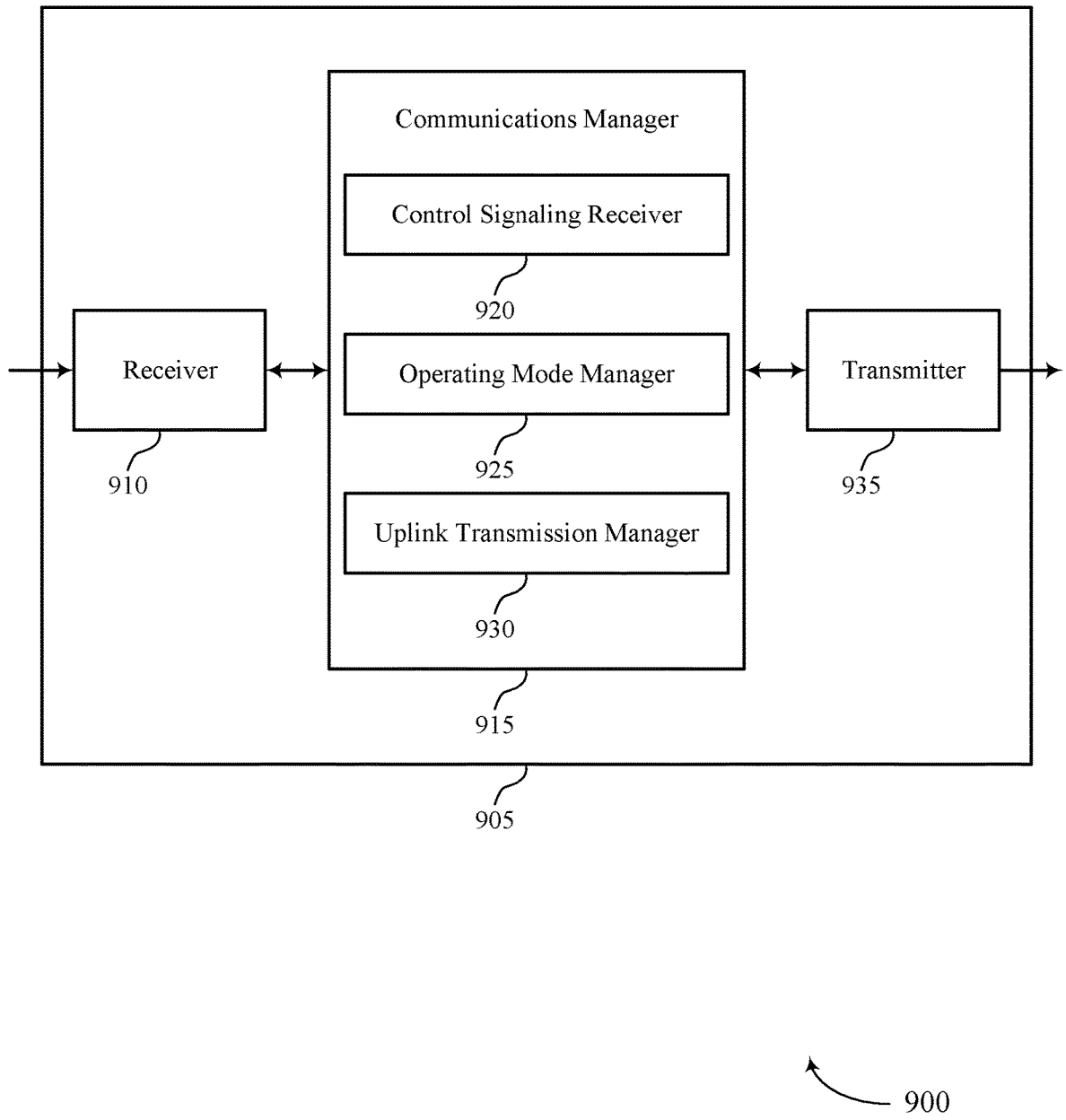

FIG. 9 shows a block diagram 900 of a device 905 that supports UE operation in a high efficiency transmission operating mode in accordance with aspects of the present disclosure. The device 905 may be an example of aspects of a device 805, or a UE 115 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to UE operation in a high efficiency transmission operating mode, etc.). Information may be passed on to other components of the device 905. The receiver 910 may be an example of aspects of the radio 1120 described with reference to FIG. 11. The receiver 910 may utilize a single antenna or a set of antennas.

The communications manager 915 may be an example of aspects of the communications manager 815 as described herein. The communications manager 915 may include a control signaling receiver 920, an operating mode manager 925, and an uplink transmission manager 930. The communications manager 915 may be an example of aspects of the communications manager 1110 described herein.

The control signaling receiver 920 may receive, from a base station, control signaling that indicates at least one communication parameter for communicating an uplink transmission.

The operating mode manager 925 may select to operate in the first transmission efficiency operating mode based on a determination that the at least one communication parameter satisfies at least one parameter criterion for operating in the first transmission efficiency operating mode.

The uplink transmission manager 930 may transmit, based on the at least one communication parameter, the uplink transmission that is generated by operating a power amplifier of the UE in accordance with the first transmission efficiency operating mode.

The transmitter 935 may transmit signals generated by other components of the device 905. In some examples, the transmitter 935 may be collocated with a receiver 910 in a transceiver module. For example, the transmitter 935 may be an example of aspects of the radio 1120 described with reference to FIG. 11. The transmitter 935 may utilize a single antenna or a set of antennas.

A processor of a UE 115 (e.g., controlling the receiver 910, the transmitter 935, or a radio 1120) may efficiently transmit uplink transmissions, which may be received by a base station 105. The processor of the UE 115 may selectively determine to operate the UE 115 according to a higher transmission efficiency operating mode. That is, if the processor determines that communication parameters associated with the uplink transmission satisfy criterion (e.g., associated with lower power leakage or acceptable power leakage), the processor may select to operate the UE 115 according to the higher transmission efficiency operating mode. Thus, the processor may enable the UE 115 to increase power efficiency.

Figure 10:
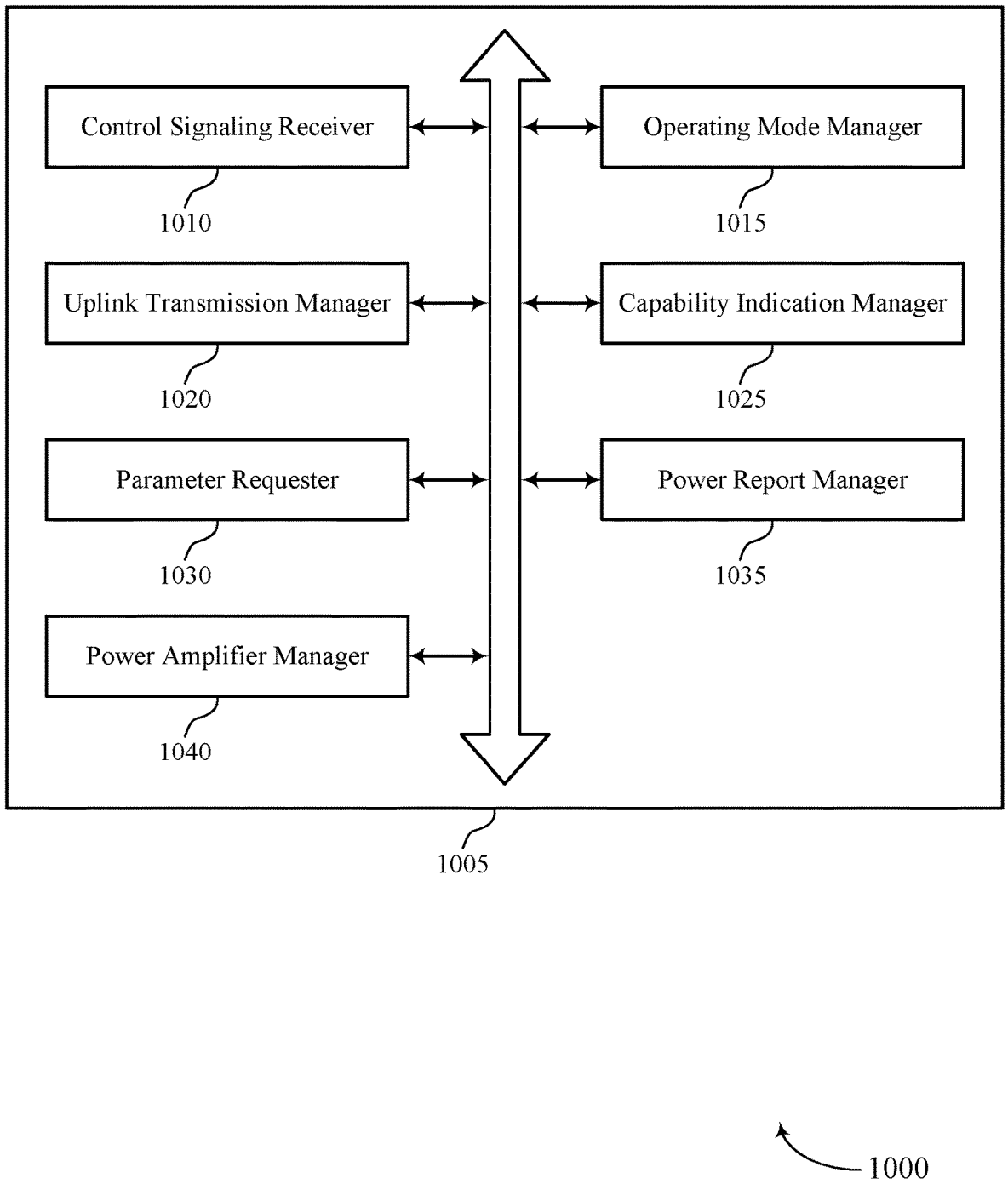
FIG. 10 shows a block diagram of a communications manager that supports UE operation in a high efficiency transmission operating mode in accordance with aspects of the present disclosure.

FIG. 10 shows a block diagram 1000 of a communications manager 1005 that supports UE operation in a high efficiency transmission operating mode in accordance with aspects of the present disclosure. The communications manager 1005 may be an example of aspects of a communications manager 815, a communications manager 915, or a communications manager 1110 described herein. The communications manager 1005 may include a control signaling receiver 1010, an operating mode manager 1015, an uplink transmission manager 1020, a capability indication manager 1025, a parameter requester 1030, a power report manager 1035, and a power amplifier manager 1040. Each of these modules may communicate, directly or indirectly, with one another (e.g., via one or more buses).

The control signaling receiver 1010 may receive, from a base station, control signaling that indicates at least one communication parameter for communicating an uplink transmission.

In some examples, the control signaling receiver 1010 may receive the control signaling that indicates the at least one communication parameter that is a scheduled uplink bandwidth part allocated for the uplink transmission, where the at least one parameter criterion is that the uplink bandwidth part satisfies a bandwidth threshold and is located at least a threshold distance away from a band edge of a channel bandwidth. In some cases, the control signaling receiver 1010 may receive the control signaling that indicates the at least one communication parameter that is an uplink modulation and coding scheme allocated for the uplink transmission, where the at least one parameter criterion is that the uplink modulation and coding scheme satisfies a modulation and coding scheme threshold.

In some instances, the control signaling receiver 1010 may receive the control signaling that indicates the at least one communication parameter that is a scheduled frequency resource that is allocated for uplink transmission, where the at least one parameter criterion is that the scheduled frequency resource satisfies a bandwidth threshold and is located at least a threshold distance away from a band edge of a channel bandwidth. In some examples, the control signaling receiver 1010 may receive the control signaling that indicates the at least one communication parameter that is a defined number of transmission time intervals, where the at least one parameter criterion is that the UE being capable of switching from the second transmission efficiency operating mode to the first transmission efficiency operating mode within the defined number of transmission time intervals.

The operating mode manager 1015 may select to operate in the first transmission efficiency operating mode based on a determination that the at least one communication parameter satisfies at least one parameter criterion for operating in the first transmission efficiency operating mode. In some examples, the operating mode manager 1015 may transmit a mode indicator to indicate that the UE is operating in the first transmission efficiency operating mode.

The uplink transmission manager 1020 may transmit, based on the at least one communication parameter, the uplink transmission that is generated by operating a power amplifier of the UE in accordance with the first transmission efficiency operating mode.

The capability indication manager 1025 may transmit, to a base station, an indication of a capability of the UE to operate according to the first transmission efficiency operating mode and the second transmission efficiency operating mode.

The parameter requester 1030 may transmit, to the base station, a request for the at least one communication parameter. In some cases, the request indicates a requested bandwidth part, a requested frequency location relative to a band edge of a channel bandwidth, or both.

The power report manager 1035 may transmit a power headroom report indicating maximum UE transmit power, power headroom, or both, for a set of subbands within a channel bandwidth, where the control signaling is received based on transmitting the power headroom report. In some examples, the power report manager 1035 may transmit a MAC control element that has a set of fields, each field of the set of fields indicating maximum UE transmit power, power headroom, or both, for a respective subband of the set of subbands per component carrier. In some cases, the power report manager 1035 may transmit the power headroom report that indicates the maximum UE transmit power, the power headroom, or both, for each full subband of the set of subbands and maximum UE transmit power, power headroom, or both, for each partial subband of the set of subbands. In some instances, the power report manager 1035 may transmit an actual power headroom report indicating maximum UE transmit power, power headroom, or both, for one or more resource blocks allocated in a grant. In some examples, the power report manager 1035 may transmit a virtual power headroom report indicating maximum UE transmit power, power headroom, or both, for one or more resource blocks based on at least one defined parameter value. In some cases, the at least one defined parameter value indicates a reference physical uplink shared channel.

The power amplifier manager 1040 may adjust at least one bias voltage for the power amplifier and at least one control parameter for a transmitter of the UE to operate in the first transmission efficiency operating mode based on the selecting to operate in the first transmission efficiency operating mode. In some examples, the power amplifier manager 1040 may generate, by the power amplifier and the transmitter, the uplink transmission based on the adjusted bias voltage. In some cases, the power amplifier manager 1040 may perform noise and undesired emission shaping on a signal to generate a noise and emission shaped signal that has lower or shaped in-band distortion based on selecting to operate in the first transmission efficiency operating mode. In some instances, the power amplifier manager 1040 may generate, by the power amplifier, the uplink transmission based on the noise and emission shaped signal. In some instances, the power amplifier manager 1040 may generate, by the power amplifier and a transmitter of the UE, the uplink transmission based on the noise and emission shaped signal. In some examples, the uplink transmission may further be generated by operating a transmitter of the UE in accordance with the first transmission efficiency operating mode.

Figure 11:
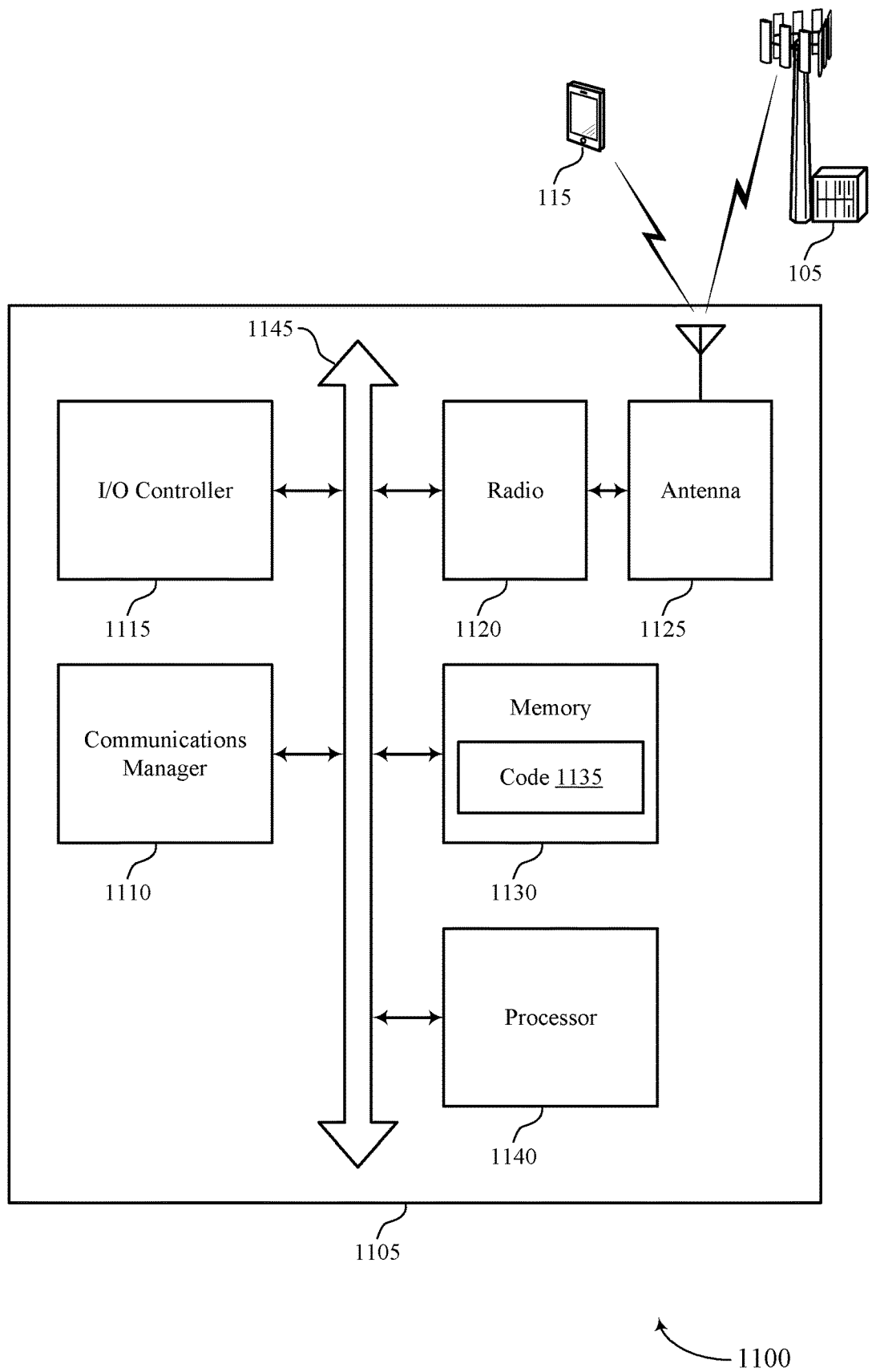
FIG. 11 shows a diagram of a system including a device that supports UE operation in a high efficiency transmission operating mode in accordance with aspects of the present disclosure.

FIG. 11 shows a diagram of a system 1100 including a device 1105 that supports UE operation in a high efficiency transmission operating mode in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a radio 1120, an antenna 1125, memory 1130, and a processor 1140. These components may be in electronic communication via one or more buses (e.g., bus 1145).

The communications manager 1110 may receive, from a base station, control signaling that indicates at least one communication parameter for communicating an uplink transmission, select to operate in the first transmission efficiency operating mode based on a determination that the at least one communication parameter satisfies at least one parameter criterion for operating in the first transmission efficiency operating mode, and transmit, based on the at least one communication parameter, the uplink transmission that is generated by operating a power amplifier of the UE in accordance with the first transmission efficiency operating mode.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The radio 1120 may communicate bi-directionally, via one or more antennas, wired, or wireless links as described above. For example, the radio 1120 may represent a wireless radio or transceiver and may communicate bi-directionally with another wireless transceiver. The radio 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code 1135 including instructions that, when executed, cause the processor to perform various functions described herein. In some cases, the memory 1130 may contain, among other things, a basic input/output system (BIOS) which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting UE operation in a high efficiency transmission operating mode).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
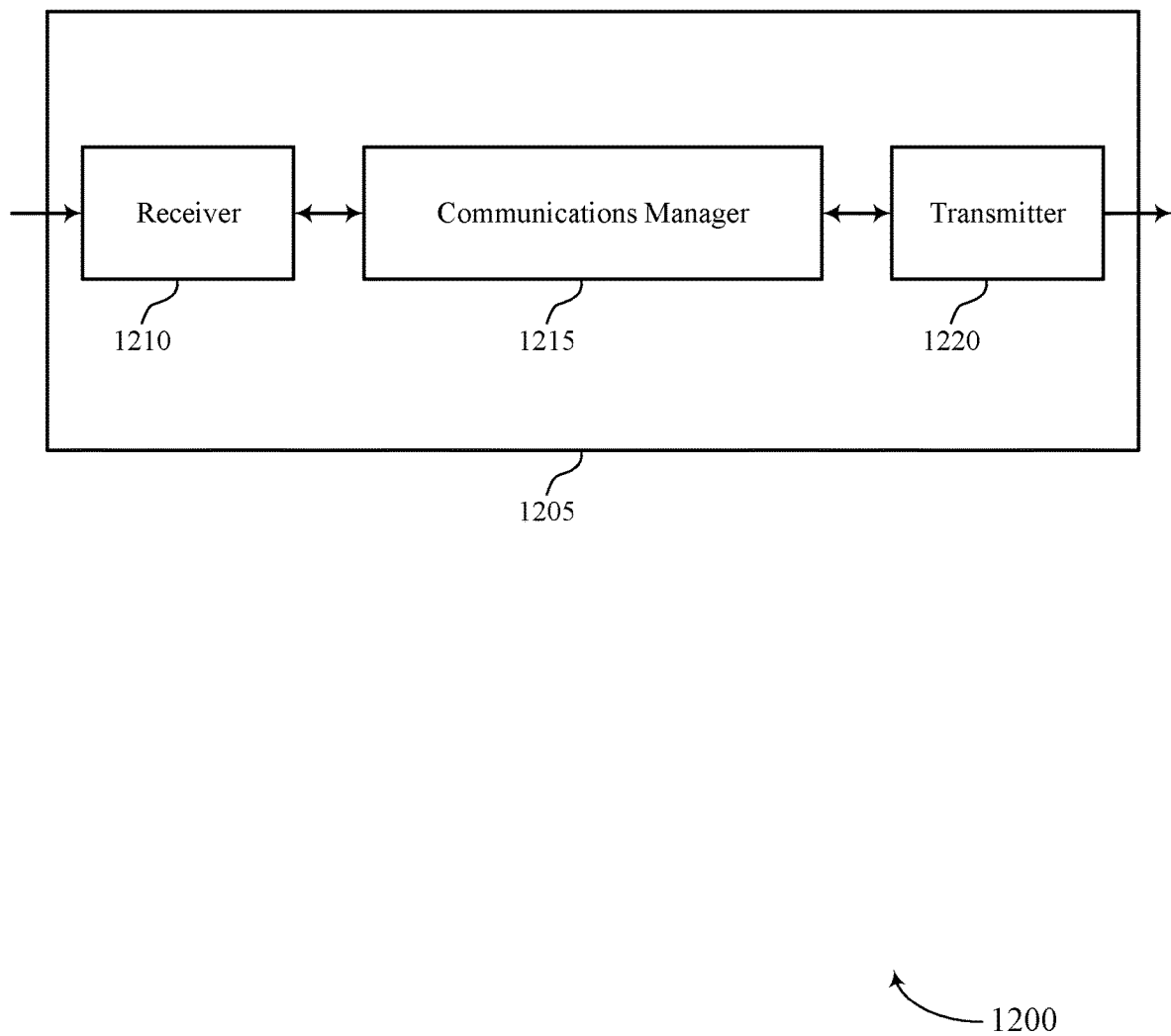
FIGS. 12 and 13 show block diagrams of devices that support UE operation in a high efficiency transmission operating mode in accordance with aspects of the present disclosure.

FIG. 12 shows a block diagram 1200 of a device 1205 that supports UE operation in a high efficiency transmission operating mode in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to UE operation in a high efficiency transmission operating mode, etc.). Information may be passed on to other components of the device 1205. The receiver 1210 may be an example of aspects of the radio 1520 described with reference to FIG. 15. The receiver 1210 may utilize a single antenna or a set of antennas.

The communications manager 1215 may transmit, to a UE, control signaling that indicates at least one communication parameter for communicating an uplink transmission, receive a mode indicator indicating that the UE is operating in a first transmission efficiency operating mode that is more power efficient and has a higher emission level than a second transmission efficiency operating mode, receive, based on the at least one communication parameter, the uplink transmission that is generated by the UE operating in accordance with the first transmission efficiency operating mode, and perform interference cancellation on the uplink transmission based on the mode indicator. The communications manager 1215 may also receive, from a UE, an indication that the UE is capable of operating in a first transmission efficiency operating mode, determine that at least one communication parameter satisfies at least one parameter criterion for operating in the first transmission efficiency operating mode, and instruct the UE to operate in the first transmission efficiency operating mode using the at least one communication parameter. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the radio 1520 described with reference to FIG. 15. The transmitter 1220 may utilize a single antenna or a set of antennas.

Figure 13:
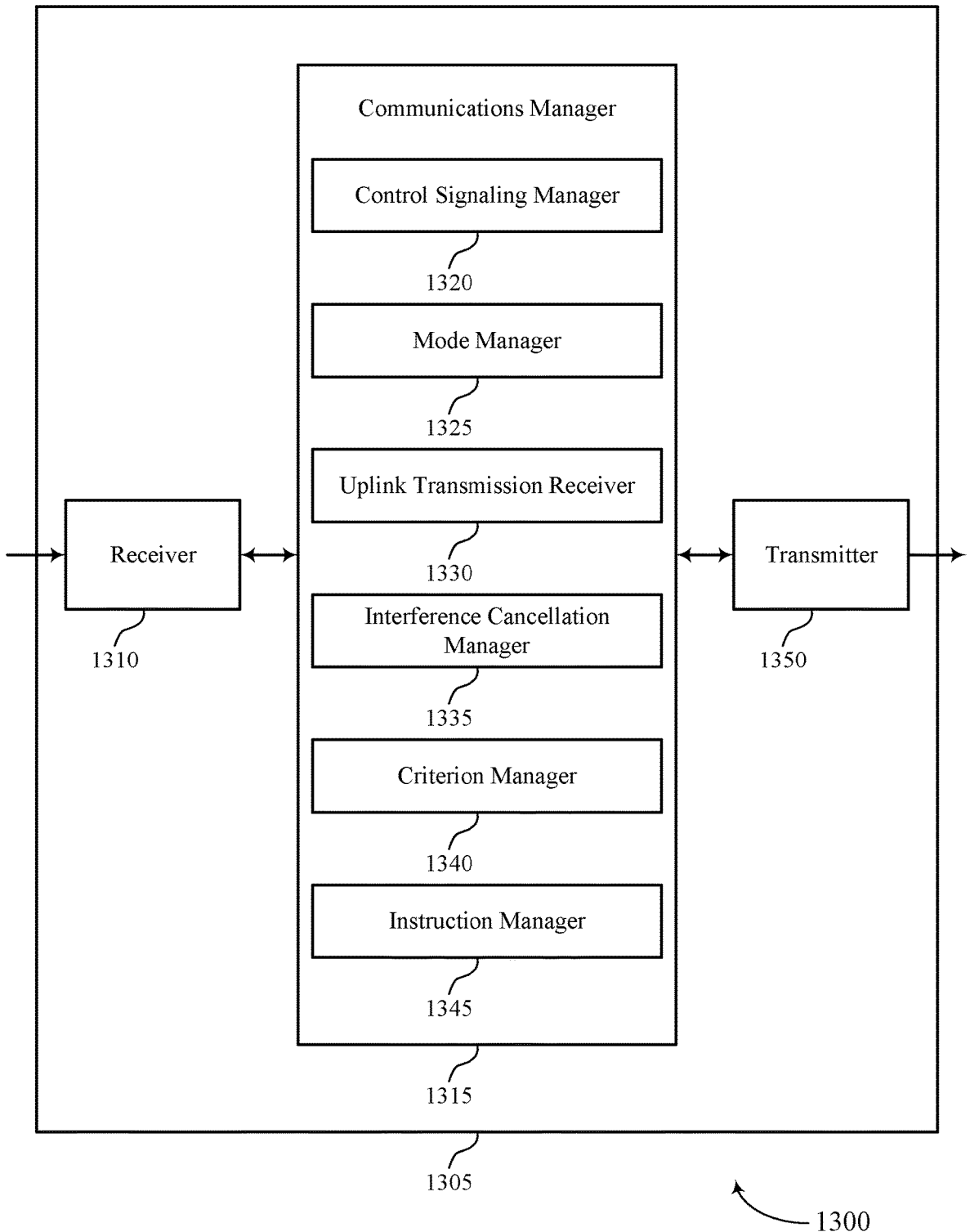

FIG. 13 shows a block diagram 1300 of a device 1305 that supports UE operation in a high efficiency transmission operating mode in accordance with aspects of the present disclosure. The device 1305 may be an example of aspects of a device 1205, or a base station 105 as described herein. The device 1305 may include a receiver 1310, a communications manager 1315, and a transmitter 1350. The device 1305 may also include a processor. Each of these components may be in communication with one another (e.g., via one or more buses).

The receiver 1310 may receive information such as packets, user data, or control information associated with various information channels (e.g., control channels, data channels, and information related to UE operation in a high efficiency transmission operating mode, etc.). Information may be passed on to other components of the device 1305. The receiver 1310 may be an example of aspects of the radio 1520 described with reference to FIG. 15. The receiver 1310 may utilize a single antenna or a set of antennas.

The communications manager 1315 may be an example of aspects of the communications manager 1215 as described herein. The communications manager 1315 may include a control signaling manager 1320, a mode manager 1325, an uplink transmission receiver 1330, an interference cancellation manager 1335, a criterion manager 1340, and an instruction manager 1345. The communications manager 1315 may be an example of aspects of the communications manager 1510 described herein.

The control signaling manager 1320 may transmit, to a UE, control signaling that indicates at least one communication parameter for communicating an uplink transmission.

The mode manager 1325 may receive a mode indicator indicating that the UE is operating in a first transmission efficiency operating mode that is more power efficient and has a higher emission level than a second transmission efficiency operating mode.

The uplink transmission receiver 1330 may receive, based on the at least one communication parameter, the uplink transmission that is generated by the UE operating in accordance with the first transmission efficiency operating mode.

The interference cancellation manager 1335 may perform interference cancellation on the uplink transmission based on the mode indicator.

The mode manager 1325 may receive, from a UE, an indication that the UE is capable of operating in a first transmission efficiency operating mode.

The criterion manager 1340 may determine that at least one communication parameter satisfies at least one parameter criterion for operating in the first transmission efficiency operating mode.

The instruction manager 1345 may instruct the UE to operate in the first transmission efficiency operating mode using the at least one communication parameter.

The transmitter 1350 may transmit signals generated by other components of the device 1305. In some examples, the transmitter 1350 may be collocated with a receiver 1310 in a transceiver module. For example, the transmitter 1350 may be an example of aspects of the radio 1520 described with reference to FIG. 15. The transmitter 1350 may utilize a single antenna or a set of antennas.

Figure 14:
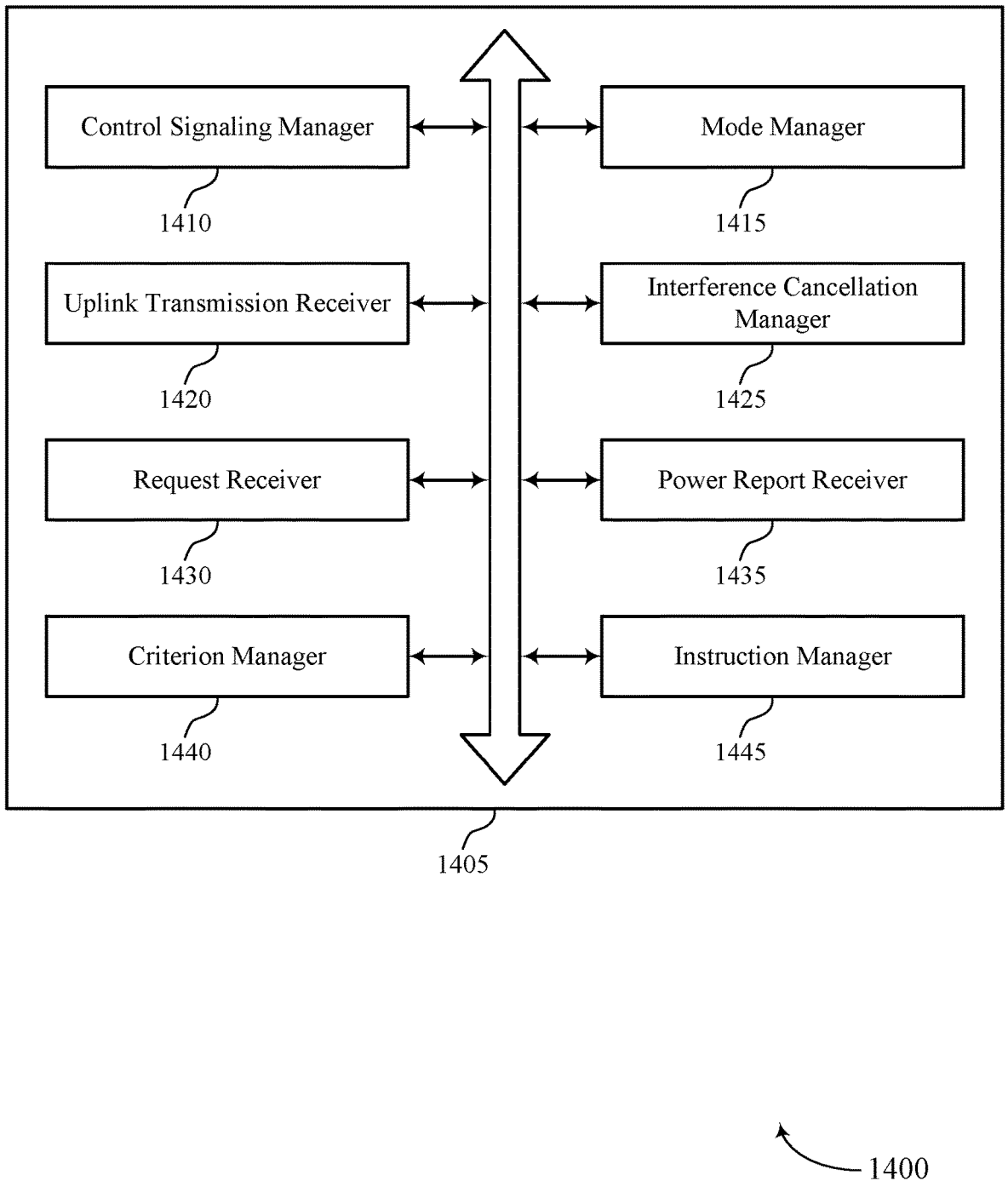
FIG. 14 shows a block diagram of a communications manager that supports UE operation in a high efficiency transmission operating mode in accordance with aspects of the present disclosure.

FIG. 14 shows a block diagram 1400 of a communications manager 1405 that supports UE operation in a high efficiency transmission operating mode in accordance with aspects of the present disclosure. The communications manager 1405 may be an example of aspects of a communications manager 1215, a communications manager 1315, or a communications manager 1510 described herein. The communications manager 1405 may include a control signaling manager 1410, a mode manager 1415, an uplink transmission receiver 1420, an interference cancellation manager 1425, a request receiver 1430, a power report receiver 1435, a criterion manager 1440, and an instruction manager 1445. Each of these modules may communicate, directly or indirectly, with one another (e.g., via one or more buses).

The control signaling manager 1410 may transmit, to a UE, control signaling that indicates at least one communication parameter for communicating an uplink transmission. In some examples, the control signaling manager 1410 may transmit the control signaling that indicates the at least one communication parameter is a scheduled uplink bandwidth part allocated for the uplink transmission. In some cases, the control signaling manager 1410 may transmit the control signaling that indicates the at least one communication parameter is an uplink modulation and coding scheme allocated for the uplink transmission. In some instances, the control signaling manager 1410 may transmit the control signaling that indicates the at least one communication parameter is a scheduled frequency resource that is allocated for the uplink transmission. In some examples, the control signaling manager 1410 may transmit the control signaling that indicates the at least one communication parameter that is a defined number of transmission time intervals.

The mode manager 1415 may receive a mode indicator indicating that the UE is operating in a first transmission efficiency operating mode that is more power efficient and has a higher emission level than a second transmission efficiency operating mode. In some examples, the mode manager 1415 may receive, from a UE, an indication that the UE is capable of operating in a first transmission efficiency operating mode. In some cases, the mode manager 1415 may receive an indication of a capability of the UE to operate according to the first transmission efficiency operating mode and the second transmission efficiency operating mode. In some instances, the mode manager 1415 may instruct the UE to operate in the first transmission efficiency operating mode using the at least one communication parameter that is a defined number of transmission time intervals.

The uplink transmission receiver 1420 may receive, based on the at least one communication parameter, the uplink transmission that is generated by the UE operating in accordance with the first transmission efficiency operating mode.

The interference cancellation manager 1425 may perform interference cancellation on the uplink transmission based on the mode indicator. In some examples, the interference cancellation manager 1425 may perform non-linear interference cancellation on the uplink transmission.

The criterion manager 1440 may determine that at least one communication parameter satisfies at least one parameter criterion for operating in the first transmission efficiency operating mode.

The instruction manager 1445 may instruct the UE to operate in the first transmission efficiency operating mode using the at least one communication parameter. In some examples, the instruction manager 1445 may instruct the UE to operate in the first transmission efficiency operating mode using the at least one communication parameter that is a scheduled uplink bandwidth part allocated for an uplink transmission. In some cases, the instruction manager 1445 may instruct the UE to operate in the first transmission efficiency operating mode using the at least one communication parameter that is an uplink modulation and coding scheme allocated for an uplink transmission. In some examples, the instruction manager 1445 may instruct the UE to operate in the first transmission efficiency operating mode using the at least one communication parameter that is a scheduled frequency resource allocated for an uplink transmission.

The request receiver 1430 may receive a request for the at least one communication parameter. In some cases, the request indicates a requested bandwidth part, a requested frequency location relative to a band edge of a channel bandwidth, or both.

The power report receiver 1435 may receive a power headroom report indicating maximum UE transmit power, power headroom, or both, for a set of subbands within a channel bandwidth. In some examples, the power report receiver 1435 may receive MAC control element that has a set of fields, each field of the set of fields indicating maximum UE transmit power, power headroom, or both, for a respective subband of the set of subbands per component carrier. In some cases, the power report receiver 1435 may receive the power headroom report that indicates the maximum UE transmit power, the power headroom, or both, for each full subband of the set of subbands and maximum UE transmit power, power headroom, or both, for each partial subband of the set of subbands. In some instances, the power report receiver 1435 may receive an actual power headroom report indicating maximum UE transmit power, power headroom, or both, for one or more resource blocks allocated in a grant. In some examples, the power report receiver 1435 may receive a virtual power headroom report indicating maximum UE transmit power, power headroom, or both, for one or more resource blocks based on at least one defined parameter value. In some cases, the at least one defined parameter value indicates a reference physical uplink shared channel.

Figure 15:
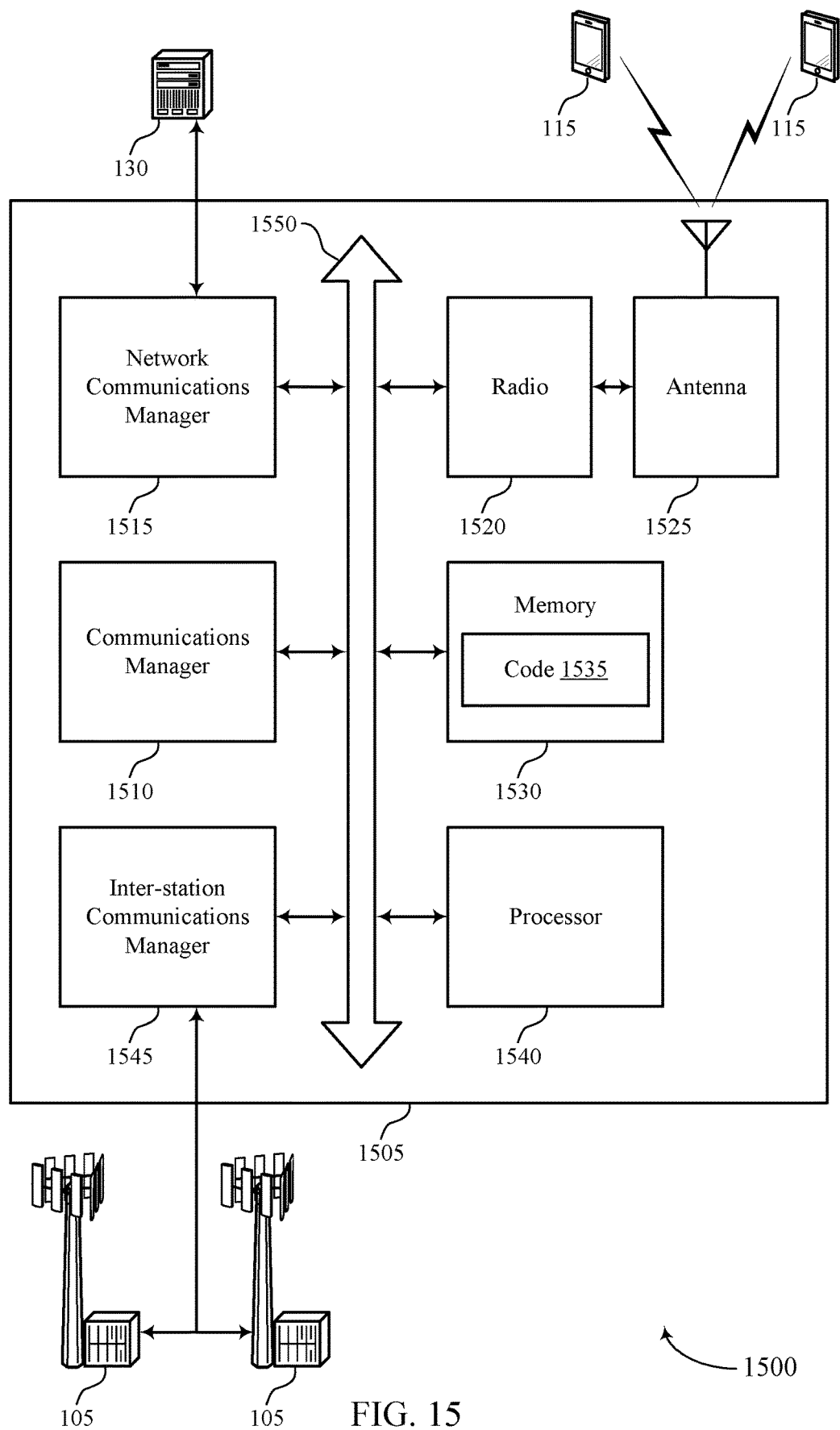
FIG. 15 shows a diagram of a system including a device that supports UE operation in a high efficiency transmission operating mode in accordance with aspects of the present disclosure.

FIG. 15 shows a diagram of a system 1500 including a device 1505 that supports UE operation in a high efficiency transmission operating mode in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a radio 1520, an antenna 1525, memory 1530, a processor 1540, and an inter-station communications manager 1545. These components may be in electronic communication via one or more buses (e.g., bus 1550).

The communications manager 1510 may transmit, to a UE, control signaling that indicates at least one communication parameter for communicating an uplink transmission, receive a mode indicator indicating that the UE is operating in a first transmission efficiency operating mode that is more power efficient and has a higher emission level than a second transmission efficiency operating mode, receive, based on the at least one communication parameter, the uplink transmission that is generated by the UE operating in accordance with the first transmission efficiency operating mode, and perform interference cancellation on the uplink transmission based on the mode indicator. The communications manager 1510 may also receive, from a UE, an indication that the UE is capable of operating in a first transmission efficiency operating mode, determine that at least one communication parameter satisfies at least one parameter criterion for operating in the first transmission efficiency operating mode, and instruct the UE to operate in the first transmission efficiency operating mode using the at least one communication parameter.

The network communications manager 1515 may manage communications with the core network (e.g., via one or more wired backhaul links). For example, the network communications manager 1515 may manage the transfer of data communications for client devices, such as one or more UEs 115.

The radio 1520 may communicate bi-directionally, via one or more antennas, wired, or wireless links as described above. For example, the radio 1520 may represent a wireless radio or transceiver and may communicate bi-directionally with another wireless transceiver. The radio 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting UE operation in a high efficiency transmission operating mode).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
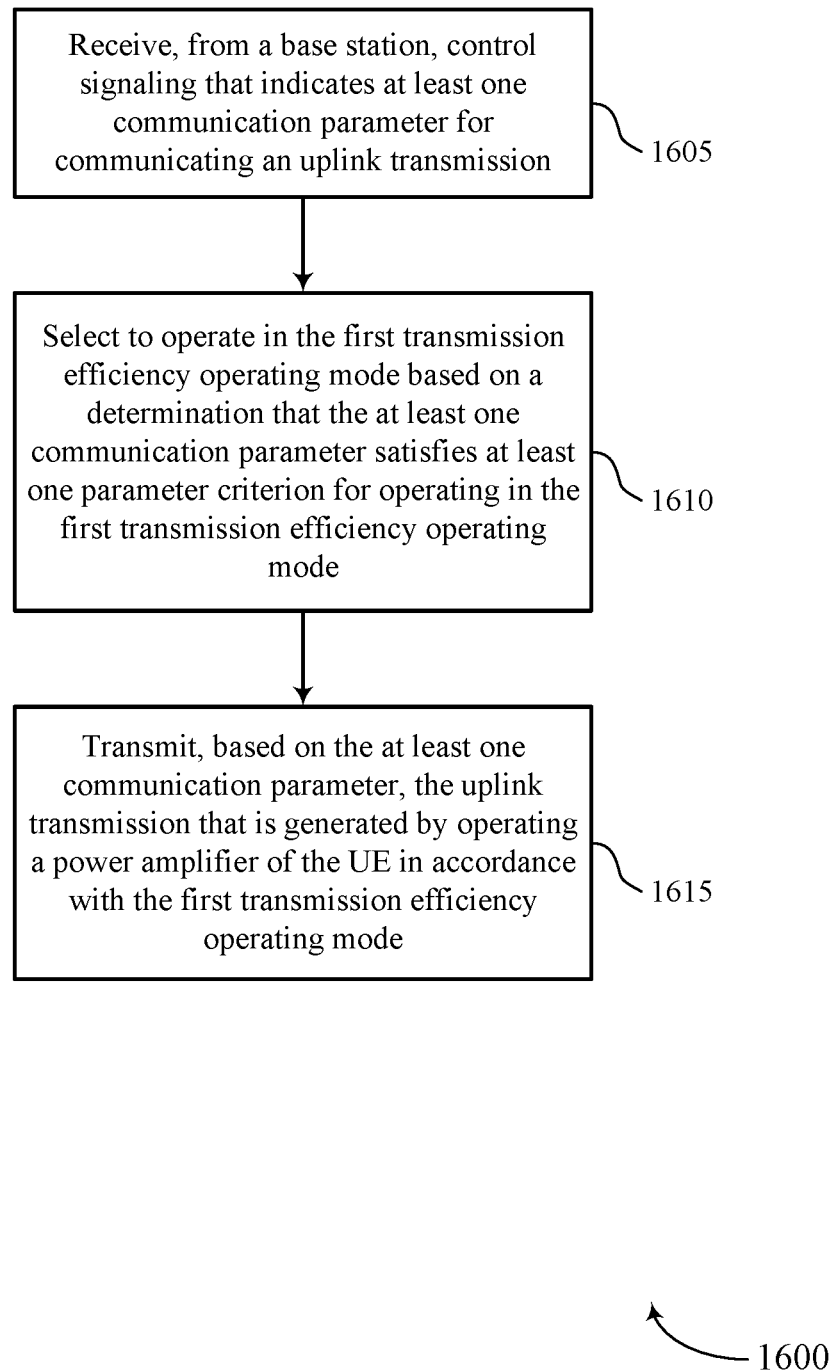
FIGS. 16 through 20 show flowcharts illustrating methods that support UE operation in a high efficiency transmission operating mode in accordance with aspects of the present disclosure.

FIG. 16 shows a flowchart illustrating a method 1600 that supports UE operation in a high efficiency transmission operating mode in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, control signaling that indicates at least one communication parameter for communicating an uplink transmission. The operations of 1605 may be performed according to the methods described herein. In some examples, aspects of the operations of 1605 may be performed by a control signaling receiver as described with reference to FIGS. 8 through 11.

At 1610, the UE may select to operate in the first transmission efficiency operating mode based on a determination that the at least one communication parameter satisfies at least one parameter criterion for operating in the first transmission efficiency operating mode. The operations of 1610 may be performed according to the methods described herein. In some examples, aspects of the operations of 1610 may be performed by an operating mode manager as described with reference to FIGS. 8 through 11.

At 1615, the UE may transmit, based on the at least one communication parameter, the uplink transmission that is generated by operating a power amplifier of the UE in accordance with the first transmission efficiency operating mode. The operations of 1615 may be performed according to the methods described herein. In some examples, aspects of the operations of 1615 may be performed by an uplink transmission manager as described with reference to FIGS. 8 through 11.

Figure 17:
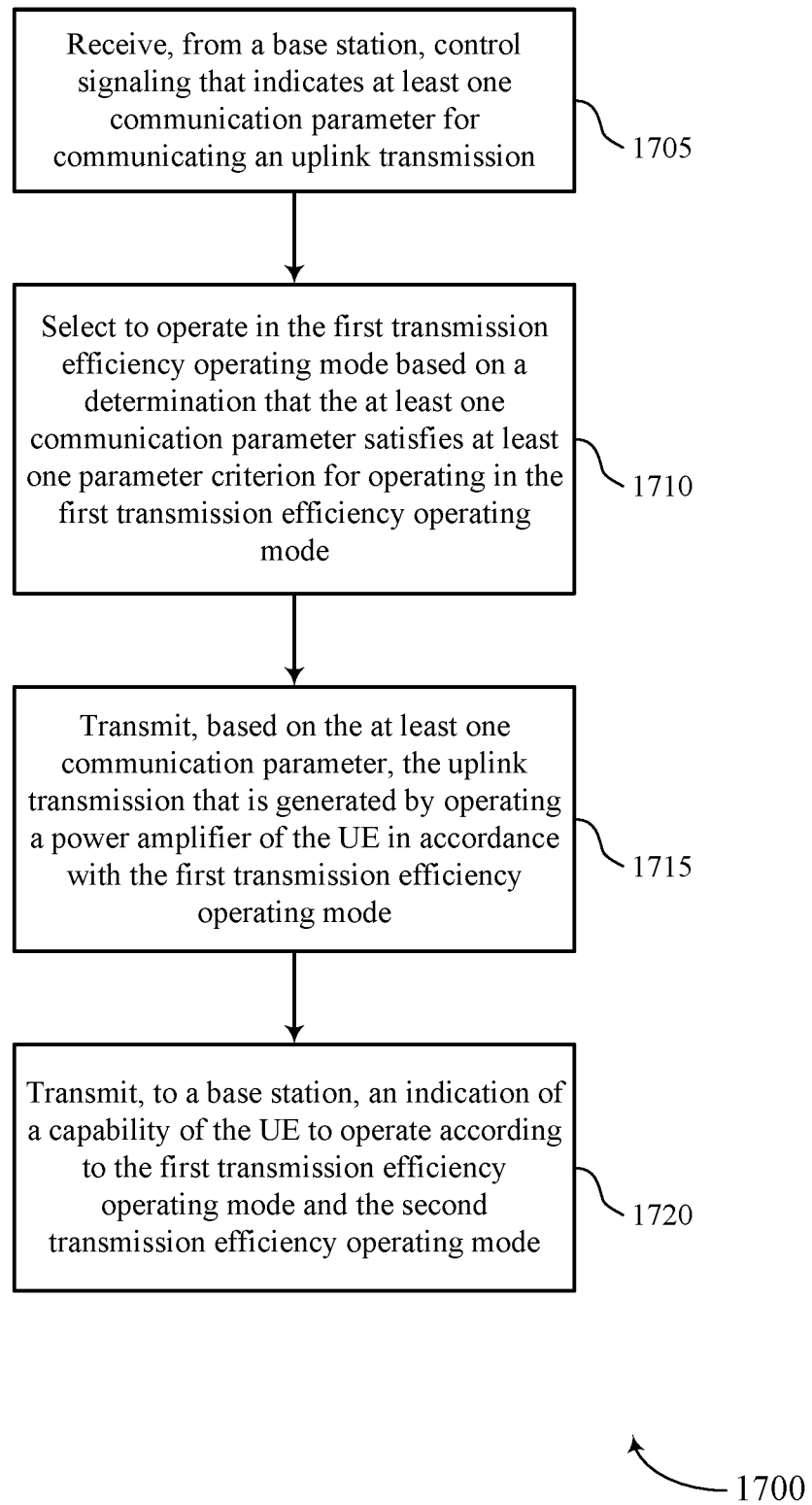

FIG. 17 shows a flowchart illustrating a method 1700 that supports UE operation in a high efficiency transmission operating mode in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, control signaling that indicates at least one communication parameter for communicating an uplink transmission. The operations of 1705 may be performed according to the methods described herein. In some examples, aspects of the operations of 1705 may be performed by a control signaling receiver as described with reference to FIGS. 8 through 11.

At 1710, the UE may select to operate in the first transmission efficiency operating mode based on a determination that the at least one communication parameter satisfies at least one parameter criterion for operating in the first transmission efficiency operating mode. The operations of 1710 may be performed according to the methods described herein. In some examples, aspects of the operations of 1710 may be performed by an operating mode manager as described with reference to FIGS. 8 through 11.

At 1715, the UE may transmit, based on the at least one communication parameter, the uplink transmission that is generated by operating a power amplifier of the UE in accordance with the first transmission efficiency operating mode. The operations of 1715 may be performed according to the methods described herein. In some examples, aspects of the operations of 1715 may be performed by an uplink transmission manager as described with reference to FIGS. 8 through 11.

At 1720, the UE may transmit, to a base station, an indication of a capability of the UE to operate according to the first transmission efficiency operating mode and the second transmission efficiency operating mode. The operations of 1720 may be performed according to the methods described herein. In some examples, aspects of the operations of 1720 may be performed by a capability indication manager as described with reference to FIGS. 8 through 11.

Figure 18:
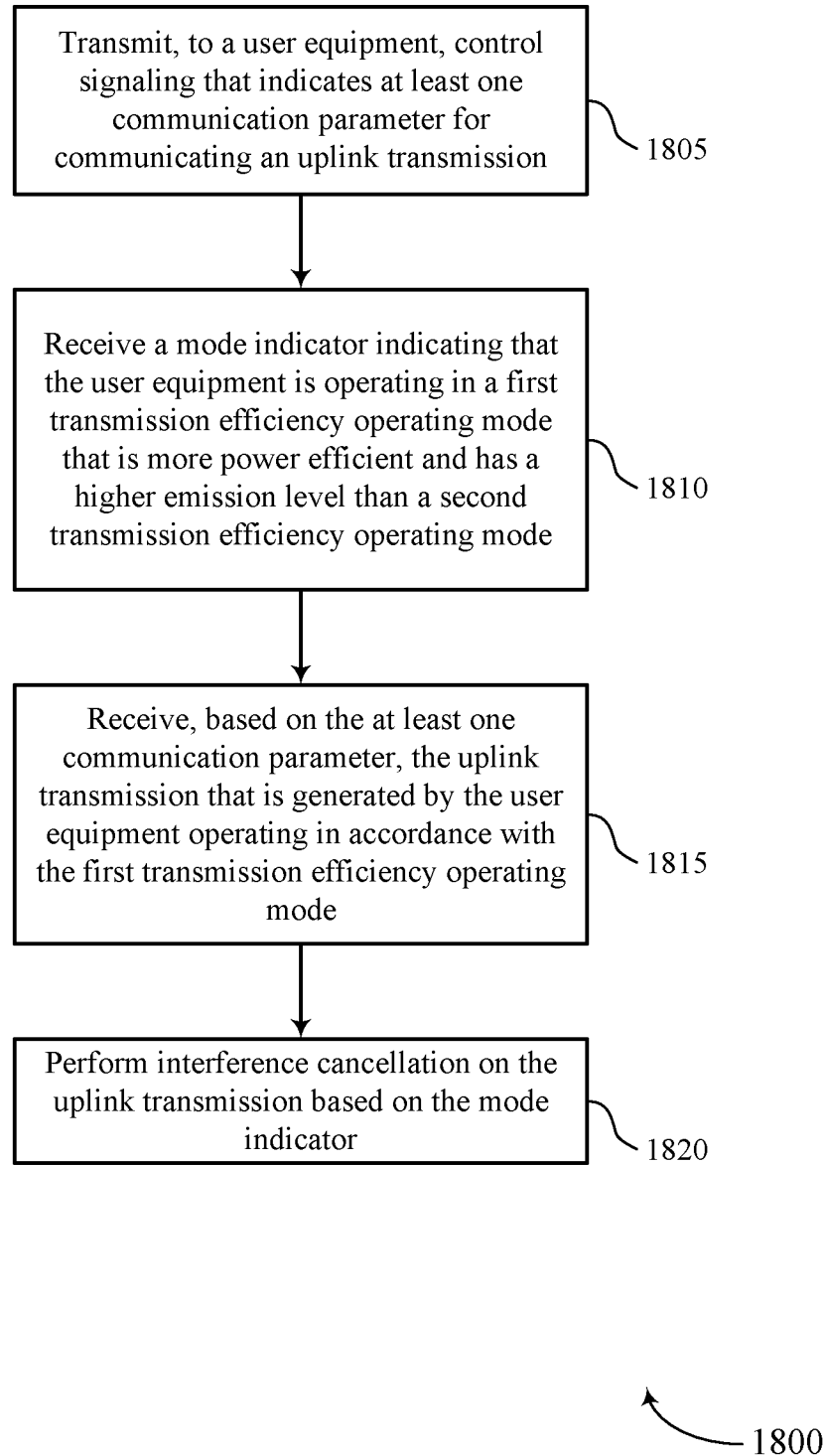

FIG. 18 shows a flowchart illustrating a method 1900 that supports UE operation in a high efficiency transmission operating mode in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, control signaling that indicates at least one communication parameter for communicating an uplink transmission. The operations of 1905 may be performed according to the methods described herein. In some examples, aspects of the operations of 1905 may be performed by a control signaling manager as described with reference to FIGS. 12 through 15.

At 1910, the base station may receive a mode indicator indicating that the UE is operating in a first transmission efficiency operating mode that is more power efficient and has a higher emission level than a second transmission efficiency operating mode. The operations of 1910 may be performed according to the methods described herein. In some examples, aspects of the operations of 1910 may be performed by a mode manager as described with reference to FIGS. 12 through 15.

At 1915, the base station may receive, based on the at least one communication parameter, the uplink transmission that is generated by the UE operating in accordance with the first transmission efficiency operating mode. The operations of 1915 may be performed according to the methods described herein. In some examples, aspects of the operations of 1915 may be performed by an uplink transmission receiver as described with reference to FIGS. 12 through 15.

At 1920, the base station may perform interference cancellation on the uplink transmission based on the mode indicator. The operations of 1920 may be performed according to the methods described herein. In some examples, aspects of the operations of 1920 may be performed by an interference cancellation manager as described with reference to FIGS. 12 through 15.

Figure 19:
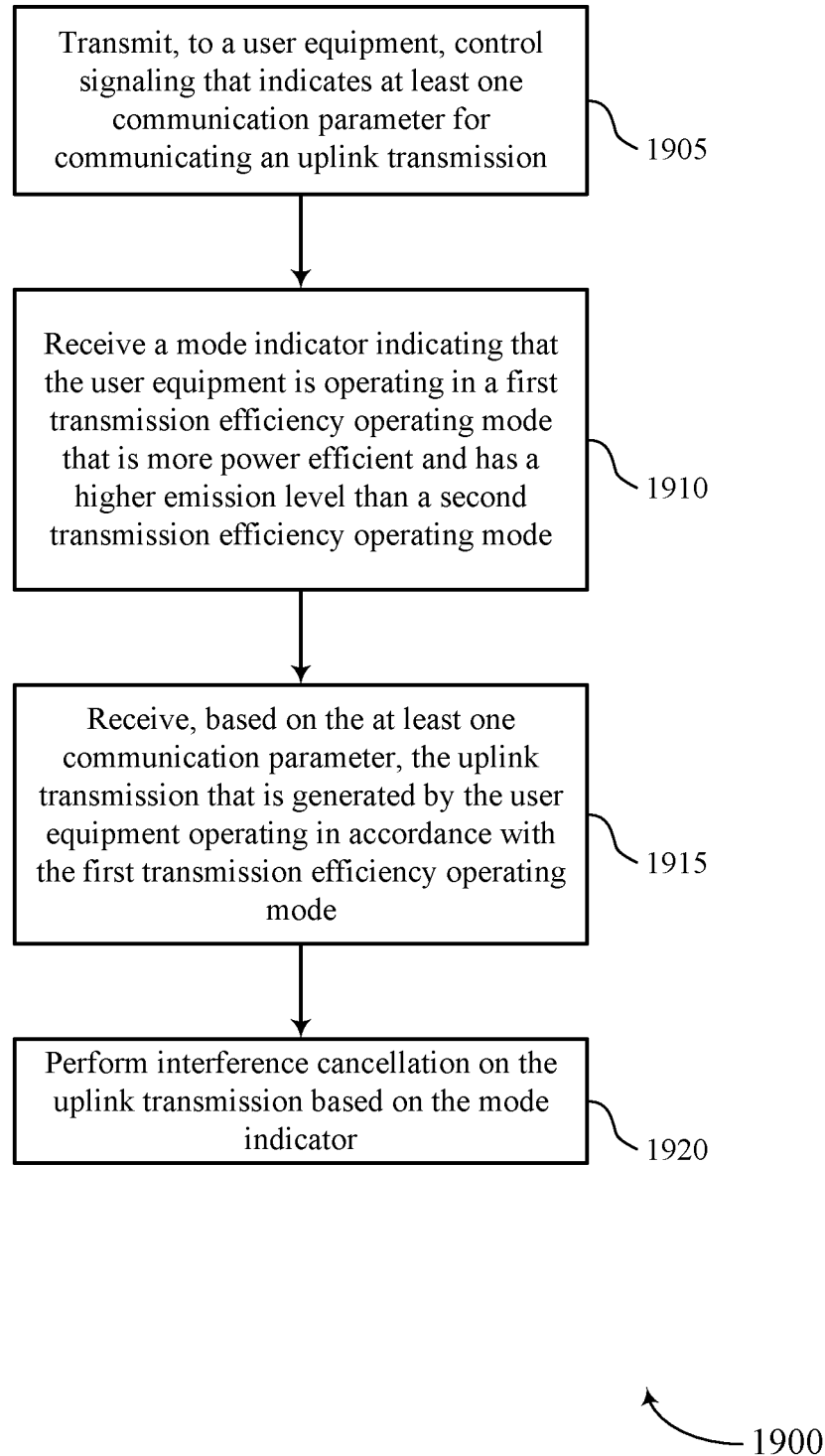

FIG. 19 shows a flowchart illustrating a method 1900 that supports UE operation in a high efficiency transmission operating mode in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, control signaling that indicates at least one communication parameter for communicating an uplink transmission. The operations of 1905 may be performed according to the methods described herein. In some examples, aspects of the operations of 1905 may be performed by a control signaling manager as described with reference to FIGS. 12 through 15.

At 1910, the base station may receive a mode indicator indicating that the UE is operating in a first transmission efficiency operating mode that is more power efficient and has a higher emission level than a second transmission efficiency operating mode. The operations of 1910 may be performed according to the methods described herein. In some examples, aspects of the operations of 1910 may be performed by a mode manager as described with reference to FIGS. 12 through 15.

At 1915, the base station may receive, based on the at least one communication parameter, the uplink transmission that is generated by the UE operating in accordance with the first transmission efficiency operating mode. The operations of 1915 may be performed according to the methods described herein. In some examples, aspects of the operations of 1915 may be performed by an uplink transmission receiver as described with reference to FIGS. 12 through 15.

At 1920, the base station may perform interference cancellation on the uplink transmission based on the mode indicator. The operations of 1920 may be performed according to the methods described herein. In some examples, aspects of the operations of 1920 may be performed by an interference cancellation manager as described with reference to FIGS. 12 through 15.

Figure 20:
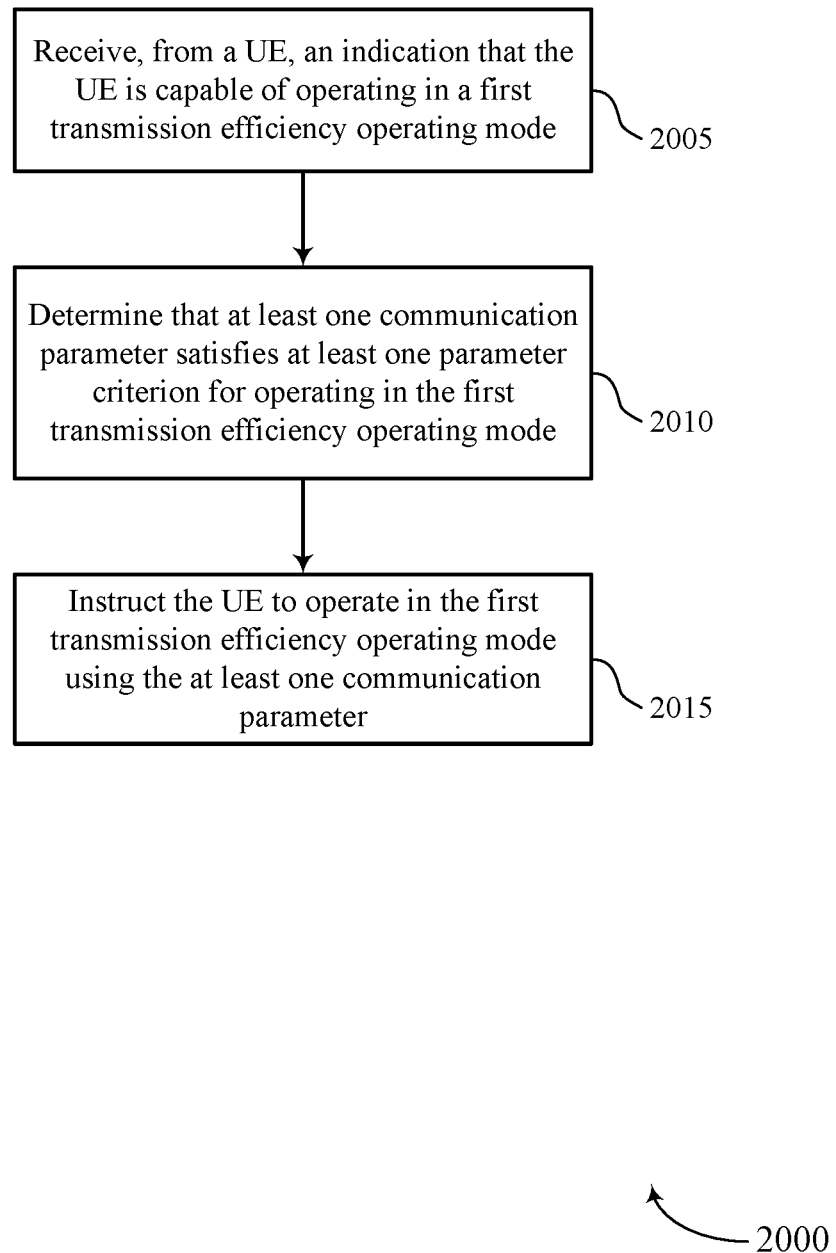

FIG. 20 shows a flowchart illustrating a method 2000 that supports UE operation in a high efficiency transmission operating mode in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2005, the base station may receive, from a UE, an indication that the UE is capable of operating in a first transmission efficiency operating mode. The operations of 2005 may be performed according to the methods described herein. In some examples, aspects of the operations of 2005 may be performed by a mode manager as described with reference to FIGS. 12 through 15.

At 2010, the base station may determine that at least one communication parameter satisfies at least one parameter criterion for operating in the first transmission efficiency operating mode. The operations of 2010 may be performed according to the methods described herein. In some examples, aspects of the operations of 2010 may be performed by a criterion manager as described with reference to FIGS. 12 through 15.

At 2015, the base station may instruct the UE to operate in the first transmission efficiency operating mode using the at least one communication parameter. The operations of 2015 may be performed according to the methods described herein. In some examples, aspects of the operations of 2015 may be performed by an instruction manager as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications by a user equipment (UE) that is capable of operating a first power amplifier of the UE according to a first transmission efficiency operating mode and a second transmission efficiency operating mode that is less power efficient than the first transmission efficiency operating mode, the first transmission efficiency operating mode associated with a first undesired emission level and the second transmission efficiency operating mode associated with a second undesired emission level that is lower than the first undesired emission level, the apparatus comprising:

the first power amplifier;
at least one antenna;
a processor;
memory coupled with the processor; and
instructions stored in the memory and executable by the processor to cause the apparatus to:
transmit a power headroom report indicating a power headroom for a plurality of subbands within a channel bandwidth, the power headroom based at least in part on a respective maximum transmit power associated with each of the plurality of subbands;
receive, from a network entity and based at least in part on transmitting the power headroom report, control signaling that indicates at least one communication parameter for communicating an uplink transmission and indicates a first subband for the uplink transmission from the plurality of subbands, each of the plurality of subbands associated with the respective maximum transmit power of a plurality of subband level maximum transmit powers;
select to operate the first power amplifier of the UE in the first transmission efficiency operating mode based at least in part on a determination that the at least one communication parameter indicated by the control signaling satisfies at least one parameter criterion for operating in the first transmission efficiency operating mode, wherein the at least one communication parameter indicated in the control signaling is a defined quantity of transmission time intervals between reception of the control signaling and transmission of the uplink transmission and the at least one parameter criterion is that the UE is capable of switching from the second transmission efficiency operating mode to the first transmission efficiency operating mode within the defined quantity of the transmission time intervals, wherein the selecting to operate in the first transmission efficiency operating mode is further based at least in part on a first maximum transmit power of the plurality of subband level maximum transmit powers, the first maximum transmit power associated with the first subband;
transmit a mode indicator to indicate that the UE is operating in the first transmission efficiency operating mode based at least in part on the UE being capable of switching from the second transmission efficiency operating mode to the first transmission efficiency operating mode within the defined quantity of the transmission time intervals between reception of the control signaling and transmission of the uplink transmission, wherein:
the first power amplifier is configured to generate the uplink transmission in accordance with the first transmission efficiency operating mode; and
the at least one antenna is configured to transmit the uplink transmission in accordance with the mode indicator, and
transmit the uplink transmission via the first subband based at least in part on the first transmission efficiency operating mode and the first maximum transmit power.

2. The apparatus of claim 1, further comprising:
a transmitter, wherein the transmitter and the first power amplifier are configured to generate the uplink transmission in accordance with the first transmission efficiency operating mode.

3. The apparatus of claim 1, wherein the instructions are further executable by the processor to cause the apparatus to:
transmit, to the network entity, an indication of a capability of the UE to operate according to the first transmission efficiency operating mode and the second transmission efficiency operating mode.

4. The apparatus of claim 1, wherein the instructions to receive the control signaling are executable by the processor to cause the apparatus to:
receive the control signaling indicating that the at least one communication parameter is a scheduled uplink bandwidth part allocated for the uplink transmission, wherein the at least one parameter criterion is that the scheduled uplink bandwidth part satisfies a bandwidth threshold and is located at least a threshold distance away from a band edge of the channel bandwidth.

5. The apparatus of claim 1, wherein the instructions to receive the control signaling are executable by the processor to cause the apparatus to:
receive the control signaling indicating the at least one communication parameter that is an uplink modulation and coding scheme allocated for the uplink transmission, wherein the at least one parameter criterion is that the uplink modulation and coding scheme satisfies a modulation and coding scheme threshold.

6. The apparatus of claim 1, wherein the instructions to receive the control signaling are executable by the processor to cause the apparatus to:
receive the control signaling indicating the at least one communication parameter that is a scheduled frequency resource that is allocated for the uplink transmission, wherein the at least one parameter criterion is that the scheduled frequency resource satisfies a bandwidth threshold and is located at least a threshold distance away from a band edge of the channel bandwidth.

7. The apparatus of claim 1, wherein the instructions are further executable by the processor to cause the apparatus to:
transmit, to the network entity, a request for the at least one communication parameter.

8. The apparatus of claim 7, wherein the request indicates a requested bandwidth part, a requested frequency location relative to a band edge of the channel bandwidth, or both.

9. The apparatus of claim 1, wherein the instructions to transmit the power headroom report are executable by the processor to cause the apparatus to:
transmit a medium access control (MAC) control element that has a plurality of fields, each field of the plurality of fields indicating a maximum UE transmit power, the power headroom, or both, for a respective subband of the plurality of subbands per component carrier.

10. The apparatus of claim 1, wherein the instructions to transmit the power headroom report are executable by the processor to cause the apparatus to:
transmit the power headroom report that indicates a maximum UE transmit power, the power headroom, or both, for each full subband of the plurality of subbands and a maximum UE transmit power, the power headroom, or both, for each partial subband of the plurality of subbands.

11. The apparatus of claim 1, wherein the power headroom report comprises an actual power headroom report, and wherein the instructions are further executable by the processor to cause the apparatus to:
transmit the actual power headroom report indicating maximum UE transmit power, the power headroom, or both, for one or more resource blocks allocated in a grant.

12. The apparatus of claim 1, wherein the power headroom report comprises a virtual power headroom report, and wherein the instructions are further executable by the processor to cause the apparatus to:
transmit the virtual power headroom report indicating maximum UE transmit power, the power headroom, or both, for one or more resource blocks based at least in part on at least one defined parameter value.

13. The apparatus of claim 12, wherein the at least one defined parameter value indicates a reference physical uplink shared channel.

14. The apparatus of claim 1, further comprising a transmitter, wherein the instructions are further executable by the processor to cause the apparatus to:
adjust at least one bias voltage for the first power amplifier and at least one control parameter of the transmitter to operate in the first transmission efficiency operating mode based at least in part on the selecting to operate in the first transmission efficiency operating mode; and
generate, by the first power amplifier and the transmitter, the uplink transmission based at least in part on adjusting the at least one bias voltage and adjusting the at least one control parameter.

15. The apparatus of claim 1, further comprising a transmitter, wherein the instructions are further executable by the processor to cause the apparatus to:
adjust at least one bias voltage of the first power amplifier and at least one control parameter for the transmitter and the first power amplifier to operate in the first transmission efficiency operating mode based at least in part on the selecting to operate in the first transmission efficiency operating mode; and
generate, by the first power amplifier and the transmitter, the uplink transmission based at least in part on adjusting the at least one bias voltage and adjusting the at least one control parameter.

16. The apparatus of claim 1, wherein the instructions are further executable by the processor to cause the apparatus to:
perform noise and undesired emission shaping on a signal to generate a noise and emission shaped signal that has lower or shaped in-band distortion based at least in part on selecting to operate in the first transmission efficiency operating mode.

17. The apparatus of claim 16, further comprising a transmitter, wherein the instructions are further executable by the processor to cause the apparatus to:
generate, by the transmitter and the first power amplifier, the uplink transmission based at least in part on the noise and emission shaped signal.

18. The apparatus of claim 1, wherein the instructions are further executable by the processor to cause the apparatus to:
transmit the uplink transmission subsequent to transmitting the mode indicator to indicate that the UE is operating in the first transmission efficiency operating mode.

19. The apparatus of claim 1, wherein the first undesired emission level corresponds to a non-linear portion of a signal output by the first power amplifier.

20. The apparatus of claim 1, wherein the first undesired emission level is a non-linear emission level, an intermodulation product emission level, a harmonic emission level, or any combination thereof, for a signal output by the first power amplifier.

21. A method for wireless communications by a user equipment (UE) that is capable of operating a first power amplifier of the UE according to a first transmission efficiency operating mode and a second transmission efficiency operating mode that is less power efficient than the first transmission efficiency operating mode, the first transmission efficiency operating mode associated with a first undesired emission level and the second transmission efficiency operating mode associated with a second undesired emission level that is lower than the first undesired emission level, the method comprising:
   transmitting a power headroom report indicating a power headroom for a plurality of subbands within a channel bandwidth, the power headroom based at least in part on a respective maximum transmit power associated with each of the plurality of subbands;
   receiving, from a network entity and based at least in part on transmitting the power headroom report, control signaling that indicates at least one communication parameter for communicating an uplink transmission and indicates a first subband for the uplink transmission from the plurality of subbands, each of the plurality of subbands associated with the respective maximum transmit power of a plurality of subband level maximum transmit powers;
   selecting to operate the first power amplifier of the UE in the first transmission efficiency operating mode based at least in part on a determination that the at least one communication parameter indicated by the control signaling satisfies at least one parameter criterion for operating in the first transmission efficiency operating mode, wherein the at least one communication parameter indicated in the control signaling is a defined quantity of transmission time intervals between reception of the control signaling and transmission of the uplink transmission and the at least one parameter criterion is that the UE is capable of switching from the second transmission efficiency operating mode to the first transmission efficiency operating mode within the defined quantity of the transmission time intervals, wherein the selecting to operate in the first transmission efficiency operating mode is further based at least in part on a first maximum transmit power of the plurality of subband level maximum transmit powers, the first maximum transmit power associated with the first subband;
   transmitting a mode indicator to indicate that the UE is operating in the first transmission efficiency operating mode based at least in part on the UE being capable of switching from the second transmission efficiency operating mode to the first transmission efficiency operating mode within the defined quantity of the transmission time intervals between reception of the control signaling and transmission of the uplink transmission; and
   transmitting, via the first subband based at least in part on the at least one communication parameter and the first maximum transmit power, the uplink transmission that is generated by operating the first power amplifier of the UE in accordance with the first transmission efficiency operating mode.

22. The method of claim 21, wherein the uplink transmission is further generated by operating a transmitter of the UE in accordance with the first transmission efficiency operating mode.

23. The method of claim 21, further comprising:
   transmitting, to the network entity, an indication of a capability of the UE to operate according to the first transmission efficiency operating mode and the second transmission efficiency operating mode.

24. The method of claim 21, wherein the receiving of the control signaling comprises:
   receiving the control signaling that indicates that the at least one communication parameter is a scheduled uplink bandwidth part allocated for the uplink transmission, wherein the at least one parameter criterion is that the scheduled uplink bandwidth part satisfies a bandwidth threshold and is located at least a threshold distance away from a band edge of the channel bandwidth.

25. The method of claim 21, wherein the receiving of the control signaling comprises:
   receiving the control signaling that indicates the at least one communication parameter that is an uplink modulation and coding scheme allocated for the uplink transmission,
   wherein the at least one parameter criterion is that the uplink modulation and coding scheme satisfies a modulation and coding scheme threshold.

26. The method of claim 21, wherein the receiving of the control signaling comprises:
   receiving the control signaling that indicates the at least one communication parameter that is a scheduled frequency resource that is allocated for uplink transmission, wherein the at least one parameter criterion is that the scheduled frequency resource satisfies a bandwidth threshold and is located at least a threshold distance away from a band edge of the channel bandwidth.

27. An apparatus for wireless communications by a user equipment (UE) that is capable of operating a first power amplifier of the UE according to a first transmission efficiency operating mode and a second transmission efficiency operating mode that is less power efficient than the first transmission efficiency operating mode, the first transmission efficiency operating mode associated with a first undesired emission level and the second transmission efficiency operating mode associated with a second undesired emission level that is lower than the first undesired emission level, the apparatus comprising:
   means for transmitting a power headroom report indicating a power headroom for a plurality of subbands within a channel bandwidth, the power headroom based at least in part on a respective maximum transmit power associated with each of the plurality of subbands;
   means for receiving, from a network entity and based at least in part on transmitting the power headroom report, control signaling that indicates at least one communication parameter for communicating an uplink transmission and indicates a first subband for the uplink transmission from the plurality of subbands, each of the plurality of subbands associated with the respective maximum transmit power of a plurality of subband level maximum transmit powers;
   means for selecting to operate the first power amplifier of the UE in the first transmission efficiency operating mode based at least in part on a determination that the at least one communication parameter indicated by the control signaling satisfies at least one parameter criterion for operating in the first transmission efficiency operating mode, wherein the at least one communication parameter indicated in the control signaling is a defined quantity of transmission time intervals between reception of the control signaling and transmission of the uplink transmission and the at least one parameter criterion is that the UE is capable of switching from the second transmission efficiency operating mode to the first transmission efficiency operating mode within the defined quantity of the transmission time intervals, wherein the means for selecting to operate in the first transmission efficiency operating mode is further based at least in part on a first maximum transmit power of the plurality of subband level maximum transmit powers, the first maximum transmit power associated with the first subband;

means for transmitting a mode indicator to indicate that the UE is operating in the first transmission efficiency operating mode based at least in part on the UE being capable of switching from the second transmission efficiency operating mode to the first transmission efficiency operating mode within the defined quantity of the transmission time intervals between reception of the control signaling and transmission of the uplink transmission; and means for transmitting, via the first subband based at least in part on the at least one communication parameter and the first maximum transmit power, the uplink transmission that is generated by operating the first power amplifier of the UE in accordance with the first transmission efficiency operating mode.

* * * * *